United States Patent
Liang et al.

(10) Patent No.: US 7,409,476 B1
(45) Date of Patent: Aug. 5, 2008

(54) SYSTEM AND METHOD FOR USB CONTROLLERS

(75) Inventors: Ping Liang, Irvine, CA (US); Zong Liang Wu, Irvine, CA (US); Jing Wang, Riverside, CA (US)

(73) Assignee: Oxford Semiconductor, Inc., Milpitas, CA (US)

( * ) Notice: Subject to any disclaimer, the term of this patent is extended or adjusted under 35 U.S.C. 154(b) by 0 days.

(21) Appl. No.: 11/362,320

(22) Filed: Feb. 24, 2006

Related U.S. Application Data

(62) Division of application No. 10/100,482, filed on Mar. 18, 2002, now Pat. No. 7,035,948.

(60) Provisional application No. 60/277,093, filed on Mar. 19, 2001.

(51) Int. Cl.
*G06F 3/00* (2006.01)
*G06F 13/28* (2006.01)
*G06F 13/36* (2006.01)

(52) U.S. Cl. ............... 710/52; 710/14; 710/22; 710/40; 710/310

(58) Field of Classification Search ......... 710/6, 710/14, 22, 40, 52, 56, 308, 310
See application file for complete search history.

(56) References Cited

U.S. PATENT DOCUMENTS 4,268,908 A * 5/1981 Logue et al. ............... 712/38
5,933,611 A * 8/1999 Shakkarwar ............... 710/100
6,349,354 B1 * 2/2002 Garney ....................... 710/313
6,842,797 B1 * 1/2005 Lawande ..................... 710/35
2002/0116565 A1 * 8/2002 Wang et al. ................. 710/313

FOREIGN PATENT DOCUMENTS

WO   WO 2004/102406 A1 * 11/2004

* cited by examiner

*Primary Examiner*—Glenn A. Auve
*Assistant Examiner*—Nimesh G Patel
(74) *Attorney, Agent, or Firm*—Klein, O'Neill & Singh, LLP

(57) ABSTRACT

A USB controller is provided with multiple logic channels that share same physical address and data bus at an interface between the host system and the USB Host Controller; and dataports used by the host system to read and/or write data to the USB Host Controller. Also provided is a data packet format for transferring data, which comprises of an Endpoint Transfer Descriptor ("ETD") that includes an EndPoint Descriptor and a Transfer Descriptor, wherein the host system programs the parameters of a communication channel for a particular Endpoint. Also included is a technique for partitioning a memory storage device into a first memory buffer and a second memory buffer; wherein the size of the first and second memory buffer may be programmed by the host system and the first and/or second memory buffer may contain more than one USB packet.

16 Claims, 45 Drawing Sheets

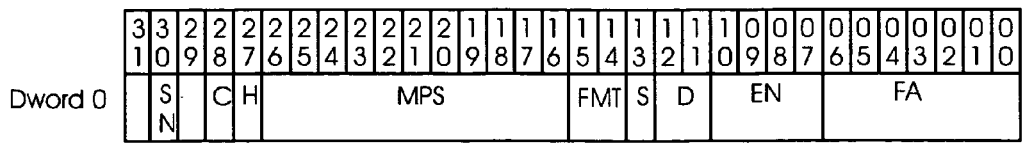

FIG. 4A

| Figure 4B Name | HC Access | Description |
|---|---|---|
| FA | R | FunctionAddress<br>This is the USB address of the function containing the endpoint that this ED controls |
| EN | R | EndpointNumber<br>This is the USB address of the endpoint within the function |
| D | R | Direction<br>This 2-bit field indicates the direction of data flow (IN or OUT.) If neither IN nor OUT is specified, then the direction is determined from the PID field of the TD. The encoding of the bits of this field are<br>Code<br>Direction<br><br>00b<br>Get direction from TD<br><br>01b<br>OUT (to endpoint)<br><br>10b<br>IN (from endpoint)<br><br>11b<br>Get direction from TD |
| S | R | Speed<br>Indicates the speed of the endpoint: full-speed (S=0) or low-speed (S=1.) |
| FMT | R | Format<br>This bit indicates the format of the TD linked to this ED.<br>FMT<br>Type<br><br>00b<br>Control<br><br>01b<br>Isochronous<br><br>10b<br>Bulk |

FIG. 4B(i)

| ⓐ | ⓑ | ⓒ | ⓓ |
|---|---|---|---|
| | | 11b<br>Interrupt | |
| MPS | R | MaximumPacketSize<br>This field indicates the maximum number of bytes that can be sent to or received from the endpoint in a single data packet. The following table show max size allowed by USB 2.0 spec for low-speed and full-speed devices<br><br>FMT          Max # of bytes (Full-Speed)<br>                Max # of bytes (Low-Speed)<br><br>Interrupt        64<br>                   8<br><br>Control          64<br>                   8<br><br>Bulk            64<br>                   Not allowed<br><br>ISO             1024<br>                   Not allowed | |
| H | R/W | Halted<br>This bit is set by the HC to indicate that processing of the TD on the endpoint is halted, usually due to an error in processing a TD. | |
| C | R/W | ToggleCarry<br>This bit is the data toggle carry bit. Whenever a TD is retired, this bit is written to contain the last data toggle value (LSb of data Toggle field) from the retired TD. This field is not used for Isochronous Endpoints. | |
| SN | R/W | StopOnNak:<br>'0': NAK is a good handshake and no special action is taken (normal USB working mode);<br>'1': upon a NAK handshake, the ETD is retired and put on DoneQueue. An interrupt may be generated depending on the DelayInterrupt bit and the ImmediateInterrupt bit. | |

FIG. 4B

| 4B(i) |
|---|
| 4B(ii) |

| | 31 30 | 29 28 27 26 25 24 23 22 21 20 | 19 18 17 16 15 14 13 12 11 10 9 8 7 6 5 4 3 2 1 0 |
|---|---|---|---|
| Dword 1 | | YBufferStartAddress (YBSA) | XBufferStartAddress (XBSA) |
| Dword 2 | CC | EC   T   DI   R   DP | RTD |
| Dword 3 | NumberofPacketsPerBuf | LPS | PacketCount(PC) |
| Dword 4 | pHC | DMA | — | FT S KF | RTDC |

FIG. 4F

| | 31 30 | 29 28 27 26 25 24 23 22 21 20 | 19 18 17 16 15 14 13 12 11 10 9 8 7 6 5 4 3 2 1 0 |
|---|---|---|---|
| Dword 1 | | YBufferStartAddress (YBSA) | XBufferStartAddress (XBSA) |
| Dword 2 | CC | EC   T   DI   R   DP | RPP | PI |
| Dword 3 | NumberofPacketsPerBuf | LPS | PacketCount(PC) |
| Dword 4 | pHC | DMA | — | PIC |

Field Definitions for Control/Bulk, Interrupt TD

| Name | HC Access | Description |
|---|---|---|
| XBSA | R | XbufferStartAddress<br>Contains the physical start address of the mega- buffer X allocated for this TD that will be accessed for transfer to/from the endpoint. |
| YBSA | R | YbufferStartAddress<br>Contains the physical start address of the mega- buffer y allocated for this TD that will be accessed for transfer to/from the endpoint. |
| PC | R/W | PacketCount<br>Indicates the total number of packets associated with this TD. Has a range of 0 to ($2^{16}$-1). Therefore, maximum number of bytes that can be transferred by a Control/Bulk TD is 4M bytes (64k x64 bytes) For an OUT endpoint, this value is decremented by 1 by the internal logic, each time a complete packet has been read out by the internal logic. A value of 1 indicates the last packet to be read out.<br>For an IN endpoint, the value is decremented by 1 by the internal logic, each time a packet has been received.<br>Reception of a short packet indicates the end of the current transfer. System software may use the last value of PacketCount to deduce how many packets have been actually received for this ETD. The last received packet size is indicated by the LastPacketSize. |
| LPS | R/W | LastPacketSize<br>Indicates the packet length of the last packet described by this TD. For an OUT, system software uses this value to inform HC how many bytes HC should expect from the system software for the last packet. For an IN, HC uses this value to inform the system software how many bytes are received from the last packet of the transfer. |
| NP | R | NumberofPacketPerBuffer<br>Defines the number of packets each of the two mega- buffers (X and Y) can contain. NP has a range between 0 and 511. |
| DP | R | Direction/PID<br>This 2-bit field indicates the direction of data flow and the PID to be used for the token. This field is only relevant to the HC if the D field in the ED was set to 00b or 11b indicating that the PID determination is deferred to the TD. The encoding of the bits within the bytes for this field is :<br>Code<br>PID<br>Type<br>Data<br>Direction |

FIG. 4G(i)

| | | |
|---|---|---|
| | | 00b<br>SETUP<br>to endpoint<br><br>01b<br>OUT<br>to endpoint<br><br>10b<br>IN<br>from endpoint<br><br>11b<br>Reserved |
| R | R | BufferRounding<br>If this bit is 0, then the last data packet to a TD from an endpoint must exactly fill the defined data buffer. If the bit is 1, then the last data packet may be smaller than the defined buffer without causing an error condition on the TD. |
| DI | R | DelayInterrupt<br>This field contains the interrupt delay count for this TD. When a TD is complete the HC may wait for DelayInterrupt frames before generating an interrupt. If DelayInterrupt is 111b, then there is no interrupt associated with completion of this TD. |
| T | R/W | DataToggle<br>This 2-bit field is used to generate/compare the data PID value (DATA0 or DATA1). It is updated by the HC after each successful transmission/reception of a data packet. The MSb of this field is '0' when the data toggle value is acquired from the ToggleCarry field in the ED and '1' when the data toggle value is taken from the Lsb of this field. |
| EC | R/W | ErrorCount<br>For each transmission error, this value is incremented. The MSB of the EC is used to define two levels of error tolerance.<br>MSB=0: standard OHCI tolerance: If ErrorCount is 3 and another error occurs (i.e. there have been 4 consecutive errors), the error type is recorded in the CompletionCode field and the ETD is placed on the done queue.<br>MSB=1: enhenced tolerance: If ErrorCount is 7 and another error occurs (i.e. there have been 8 consecutive errors), the error type is recorded in the CompletionCode field and the ETD is placed on the done queue.<br>ErrorCount is reset to 0 after each error-free transaction. When a transaction completes without error, ErrorCount is reset to 0. |
| CC | R/W | CompletionCode<br>This field contains the status of the last attempted transaction. |

FIG. 4G(ii)

| (a) | (b) | (c) (d) |
|---|---|---|
| RTD | R | RetryDelay<br>Meaningful when a non-periodic endpoint is to be executed consecutively, without any other endpoint in-between. The unit is ms (frame). When 0, immediate retry can be done. When not 0, there will not be immediate retry. Retry will be done only after RetryDelay frames. |
| PI | R | Polling Interval<br>This is the (polling interval-1) in number of frames of the interrupt endpoint. The value is between 0 and 255 (frames or ms). Whenever PollingIntervalCounter(PIC) reaches 0, interrupt transaction is attempted, and reload PI into this PIC. PIC will decrement the count for every SOF. |
| RPP | R/W | RelativePollingPosition<br>It indicates in which relative frame within the polling interval the transaction needs to be attempted for the interrupt endpoint. The value is between 0 and 255. Once the ETD is written into the ETD table and is enabled, and the 6 LSB of the FrameNumber matches this number, first interrupt transaction is attempted, then every PollingInterval there after. |
| RTDC | R/W | RetryDelayCount<br>Internal counter for RetryDelay. |
| SKF | R/W | SkipFrame<br>Skip current frame. Used for managing the RetryDelay. |
| FT | R/W | FrameToggle |
| pHC | R/W | Phc<br>internal physical memory pointer for the HC side. |
| DMA | R | DMA Select & Enable<br>The Msb is the DMA Enable : '1' enables the DMA , '0' disables the DMA. The LSb selects the DMA channel : '0' selects DMA channel 0, '1' selects DMA channel 1.<br>This field is got from the DMA Configuration Register. |
| PIC | R/W | PollingIntervalCount<br>Internal counter for the Polling Interval. |

FIG. 4G(iii)

FIG. 4G

| 4G(i) |
|---|
| 4G(ii) |
| 4G(iii) |

| | 3 3 2 2 2 2 2 2 2 2 2 2 1 1 1 1 1 1 1 1 1 1 0 0 0 0 0 0 0 0 0 0 | | | | | | |
|---|---|---|---|---|---|---|---|---|
| | 1 0 9 8 7 6 5 4 3 2 1 0 9 8 7 6 5 4 3 2 1 0 9 8 7 6 5 4 3 2 1 0 | | | | | | |
| Dword 1 | YBufferStartAddress (YBSA) | | | XBufferStartAddress (XBSA) | | | |
| Dword 2 | CC | - | FC | - | DI | - | NP | StartingFrame |
| Dword 3 | CC1 | | | | Length1/PSW1 | | CC0 | Length0/PSW0 |
| Dword 4 | CC3 | | | | Length3/PSW3 | | CC2 | Length2/PSW2 |
| Dword 5 | CC5 | | | | Length5/PSW5 | | CC4 | Length4/PSW4 |
| Dword 6 | CC7 | | | | Length7/PSW7 | | CC6 | Length6/PSW6 |
| Dword 7 | - | DMA | - | - | - | pHC | - | - |

FIG. 4H

Field Definitions for Control/ Bulk, Interrupt TD

| Name | HC Access | Description |
|---|---|---|
| XBSA | R | XbufferStartAddress<br>Contains the physical start address of the mega- buffer X allocated for this TD that will be accessed for transfer to/from the endpoint. |
| YBSA | R | YbufferStartAddress<br>Contains the physical start address of the mega- buffer y allocated for this TD that will be accessed for transfer to/from the endpoint. |
| SF | R | StartingFrame<br>This field contains the low order 16 bits of the frame number in which the first data packet of the Isochronous TD is to be sent. |
| NP | R | Numberofpacket Per Buffer<br>Defines the number of packets each of the two mega-buffer (X and Y) can contain. NP has a range between 0 and 7. |
| DI | R | DelayInterrupt<br>This field contains the interrupt delay for this Isochronous TD. When the TD is retired, the HC waits DI frames before generating an interrupt. |
| FC | R/W | FrameCount<br>Number of data packets (frames) of data described by this Isochronous TD. FrameCount=0 implies 1 data packet and FrameCount=7 implies 8. |
| CC | R/W | CompletionCode<br>This field contains the completion code when the Isochronous TD is moved to the DoneQueue. |
| LengthN | R | Length of buffer N (N=0 to M-Buf)<br>Meaningful for OUT endpoint. Defines the size of Nth isochronous data packet. |
| PSWN | W | PacketStatusWord N<br>Contains Completion Code and, for an IN endpoint, size received for an isochronous data packet. |
| CCn | W | CompletionCode for packet n (n=0 to 7). This code is set to No ACCESSED by software before the TD or the corresponding data packet is downloaded into the HC's local memory. |
| pHC | R/W | PHC<br>internal physical memory pointer for the HC side. |
| DMA | R | DMA Select & Enable<br>The MSb is the DMA Enable : '1' enables the DMA , '0' disables the DMA. The LSb selects the DMA channel : '0' selects DMA channel 0, '1' selects DMA channel 1.<br>This field is got from the DMA Configuration Register. |

FIG. 41

| HcFmNumber | ITD.Frame | R | ITD.FC | HC Action |
|---|---|---|---|---|
| 0xFFFC | 0xFFFE | 0xFFFE (-2) | 3 | Do nothing |
| 0xFFFD | 0xFFFE | 0xFFFF (-1) | 3 | Do nothing |
| 0xFFFE | 0xFFFE | 0x0000 | 3 | Send data packet 0 |
| 0xFFFF | 0xFFFE | 0x0001 | 3 | Send data packet 1 |
| 0x0000 | 0xFFFE | 0x0002 | 3 | Send data packet 2 |
| 0x0001 | 0xFFFE | 0x0003 | 3 | Send data packet 3 and retire Isochronous TD |

FIG. 4J

| HcFmNumber | ITD. Frame | R | ITD.FC | HC Action |
|---|---|---|---|---|
| 0xFFFC | 0xFFFE | 0xFFFE (-2) | 3 | Do nothing |
| 0xFFFD | 0xFFFE | 0xFFFF (-1) | 3 | Do nothing |
| 0xFFFE | 0xFFFE | 0x0000 | 3 | Send data packet 0 |
| Host Controller does not process Isochronous TD for three frames due to schedule overrun, then... | | | | |
| 0x0002 | 0xFFFE | 0x0004 | 3 | Retire Isochronous TD with DataOverrun in ITD.CC |

FIG. 4K

FIG. 4L

| Name | R/W | Description |
|---|---|---|
| SIZE | W | Size of Packet<br>On an IN transfer, this 11-bit field is written to contain the number of bytes received from the endpoint. On an OUT, this field is written to 0. |
| CC | W | Completion Code<br>When the Completion Code indicates NOT Accessed, the Size is in Length format. Otherwise, this field is used to indicate completion status, and the SIZE field contains the number of bytes received from the IN endpoint, or is written to 0 for an OUT endpoint. |

FIG. 4M

| Code | Meaning | Description |
|---|---|---|
| 0000 | NO ERROR | TD data packet processing completed with no detected errors. |
| 0001 | CRC | Last data packet from endpoint contained a CRC error. |
| 0010 | BITSTUFFING | Last data packet from endpoint contained a bit stuffing violation. |
| 0011 | DataToggleMismatch | Last packet from endpoint had data toggle PID that did not match the expected value. |
| 0100 | STALL | TD was moved to the Done Queue because the endpoint returned a STALL PID |
| 0101 | DeviceNotResponding | Device did not respond to token (IN) or did not provide a handshake (OUT) |
| 0110 | PIDFailure | Include<br>Check bits on PID from endpoint failed on data PID (IN) or handshake (OUT);<br>Receive PID was not valid when encountered or PID value is not defined. |
| 0111 | RESERVED | |
| 1000 | DataOverRun | The amount of data returned by the endpoint exceeded either the size of the maximum data packet allowed from the endpoint (found in MaximumPacketSize field of ED) or the remaining buffer size. |
| 1001 | DataUnderRun | The endpoint returned less than MaximumPacketSize and that amount was not sufficient to fill the specified buffer |
| 1010 | ACK | An ACK handshake is received. For debug purpose. |
| 1011 | NAK | A NAK handshake is received. Used in coordination with StopOnNak bit. |
| 1100 | BufferOverRun | During an IN, HC received data from endpoint faster than its buffer is freed by the system. |
| 1101 | BufferUnderRun | During an OUT, the system could not transfer data fast enough from the system memory to local memory to keep up with USB data rate. Used for isochronous ETDs. |
| 1110 | SCHEDULEOVERRUN | HC has detected a schedule overrun condition. |
| 111x | Not Accessed | This code is set by software before the TD or the corresponding data packet is downloaded into the HC's local memory. |

FIG. 4N

| Table offset in decimal | ETD table | FMT | Enable | Done | DMA |
|---|---|---|---|---|---|
| 0 | ETD 0 | Iso | 1 | 0 | 0 |
| 32 | ETD 1 | Non-iso | 1 | 0 | 0 |
| 64 | ETD 2 | Iso | 1 | 0 | 0 |
| 96 | ETD 3 | Non-iso | 1 | 0 | 0 |
| 128 | ETD 4 | Non-iso | 1 | 1 | 1 |
| 160 | ETD 5 | Non-iso | 0 | x | x |
| 192 | ETD 6 | Empty | 0 | | |
| 224 | ETD 7 | Empty | 0 | | |
| 256 | ETD 8 | Empty | 0 | | |
| 288 | ETD 9 | Empty | 0 | | |
| 320 | ETD 10 | Empty | 0 | | |
| 352 | ETD 11 | Empty | 0 | | |
| 384 | ETD 12 | Empty | 0 | | |
| 416 | ETD 13 | Empty | 0 | | |
| 438 | ETD 14 | Non-iso | 1 | 0 | 0 |
| 480 | ETD 15 | Iso | 1 | 0 | 1 |

An implementation example of the double mega-buffering for an OUT endpoint

Host Controller Operational Registers

| Offset | 31 ... 0 | |
|---|---|---|
| 0 | HcRevision | 800 |
| 4 | HcControl | 802 |
| 8 | HcCommandStatus | 804 |
| C | HcSystemInterruptStatus | 806 |
| 10 | HcSystemInterruptEnable | 808 |
| 14 | HcSystemInterruptDisable | 810 |
| 18 | HcETDInterruptStatus | 812 |
| 1C | HcETDInterruptEnable | 814 |
| 20 | HcETDInterruptDisable | 816 |
| 24 | HcAccessStartAddress | 818 |
| 28 | HcXYBufferFilledStatus | 820 |
| 2C | HcXYBufferFilledSet | 822 |
| 30 | HcXYBufferFilledClear | 824 |
| 34 | | |
| 38 | HcETDEnableSet | 825 |
| 3C | HcETDEnableClear | 827 |
| 40 | HcETDEnableStatus | 829 |
| 44 | | |
| 48 | | |
| 4C | HcDirectRouting | 831 |
| 50 | HcImmediateInterruptETDs | 833 |
| 54 | HcDoneQueue | 835 |
| 58 | HcFmInterval | 837 |
| 5C | HcFmRemaining | 839 |
| 60 | HcFmNumber | 841 |
| 64 | HcLSThreshold | 843 |
| 68 | HcRhDescriptorA | 845 |
| 6C | HcRhDescriptorB | 847 |
| 70 | HcRhStatus | 849 |
| 74 | HcRhPortStatus[0] | 851 |
| 78 | HcRhPortStatus[1] | |
| 7C | HcRhPortStatus[2] | |

FIG. 8A

| Key | Reset | Read/Write | | Description |
|---|---|---|---|---|
| | | HCD | HC | |
| REV | 086h | R | R | Revision<br>This read-only field contains the BCD representation of the version of the TDI-HCI specification that is implemented by this HC. For example, a value of 086h corresponds to version 0.86. All of the HC implementations that are compliant with this specification will have a value of 086h. |

801

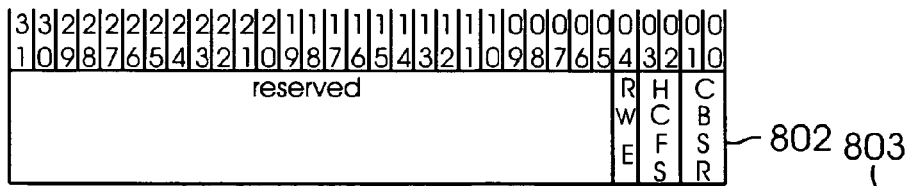

| Key | Reset | Read/Write HCD | Read/Write HC | Description |
|---|---|---|---|---|
| CBSR | 00b | R/W | R | ControlBulkServiceRatio<br>This specifies the service ratio between Control and Bulk EDs. Before processing any of the nonperiodic lists, HC must compare the ratio specified with its internal count on how many nonempty Control EDs have been processed, in determining whether to continue serving another Control ED or switching to Bulk EDs. The internal count will be retained when crossing the frame boundary. In case of reset, HCD is responsible for restoring this value.<br>CBSR  No. of Control Eds over Bulk Eds served<br>0     1:1<br>1     2:1<br>2     3:1<br>3     4:1 |
| HCFS | 00b | R/W | R/W | HostControllerFunctional State for USB<br>00b: USBReset<br>01b: USBResume<br>10b: USBOperational<br>11b: USBSuspend<br>A transition to USBOPERATIONAL from another state causes SOF generation to begin 1 ms later. HCD may determine whether HC has begun sending SOFs by reading the StartofFrame field of HcInterruptStatus. This field may be changed by HC only when in the USBSuspend state. HC may move from the USBSuspend state to the USBResume state after detecting the resume signaling from a downstream port. HC enters USBSuspend after a software reset, whereas it enters USBReset after a hardware reset. The latter also resets the Root Hub and asserts subsequent reset signaling to downstream ports. |

FIG. 8C(i)

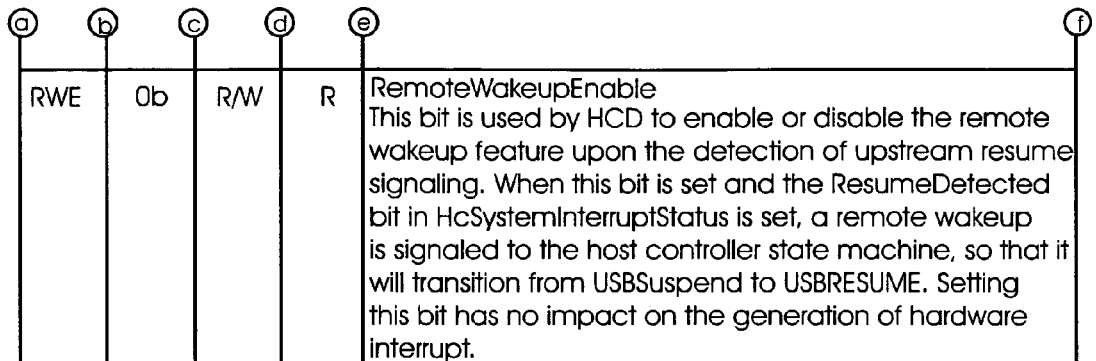

| (a) | (b) | (c) | (d) | (e) |
|---|---|---|---|---|
| RWE | 0b | R/W | R | RemoteWakeupEnable<br>This bit is used by HCD to enable or disable the remote wakeup feature upon the detection of upstream resume signaling. When this bit is set and the ResumeDetected bit in HcSystemInterruptStatus is set, a remote wakeup is signaled to the host controller state machine, so that it will transition from USBSuspend to USBRESUME. Setting this bit has no impact on the generation of hardware interrupt. |

| 8C(i) |
|---|
| 8C(ii) |

FIG. 8C(ii)

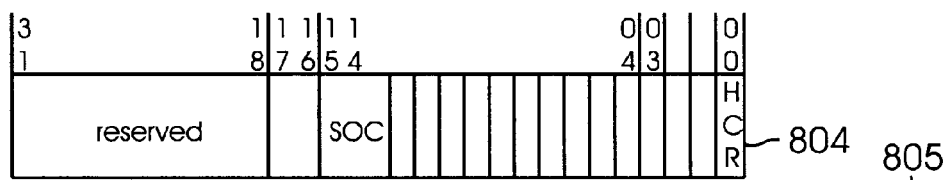

804  805

| Key | Reset | Read/Write | | Description |
|---|---|---|---|---|
| | | HCD | HC | |
| HCR | 0b | R/W | R/W | HostControllerReset<br>This bit is set by HCD to initiate a software reset of HC. Regardless of the functional state of HC, it moves to the USBSUSPEND state in which most of the operational registers are reset except those stated otherwise. This bit is cleared by HC upon the completion of the reset operation. The reset operation must be completed within 10 μs. This bit, when set, should not cause a reset to the Root Hub and no subsequent reset signaling should be asserted to its downstream ports. |
| SOC | 00b | R | R/W | SchedulingOverrunCount<br>These bits are incremented on each scheduling overrun error. It is initialized to 00b and wraps around at 11b. This will be incremented when a scheduling overrun is detected even if SchedulingOverrun in HcInterruptStatus has already been set. This is used by HCD to monitor any persistent scheduling problems. |

FIG. 8D

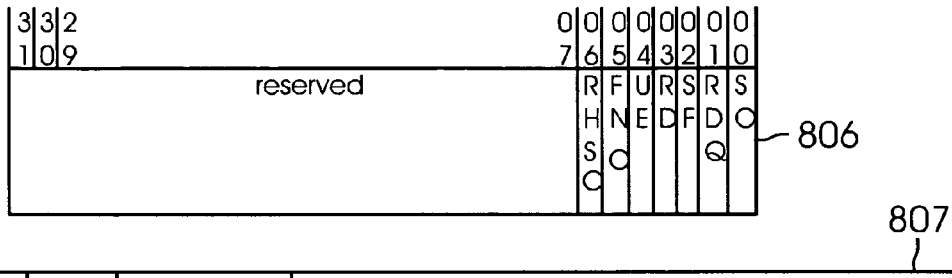

| Key | Reset | Read/Write HCD | Read/Write HC | Description |
|---|---|---|---|---|
| SO | 0b | R/W | R/W | SchedulingOverrun<br>This bit is set when the USB schedule for the current Frame overruns. A scheduling overrun will also cause the SchedulingOverrunCount of HcCommandStatus to be incremented. |
| RDQ | 0b | R/W | R/W | ReadbackDoneQueue<br>This bit is set immediately after DI reaches 0 and the DoneQueue is not empty. Futher updates of the HcDoneQueue will not occur, and interrupt will not be generated untill this bit has been cleared. HCD should only clear this bit after it has read out all retired TDs signaled by the first interrupt and after it has cleared the corresponding ETD enable bits in the ETDEnable register. |
| SF | 0b | R/W | R/W | StartofFrame<br>This bit is set by HC at each start of a frame. HC also generates a SOF token at the same time. |
| RD | 0b | R/W | R/W | ResumeDetected<br>This bit is set when HC detects that a device on the USB is asserting resume signaling. It is the transition from no resume signaling to resume signaling causing this bit to be set. This bit is not set when HCD sets the USBRESUME state. |
| UE | 0b | R/W | R/W | UnrecoverableError<br>This bit is set when HC detects a system error not related to USB. HC should not proceed with any processing nor signaling before the system error has been corrected. HCD clears this bit after HC has been reset. |
| FNO | 0b | R/W | R/W | FrameNumberOverflow<br>This bit is set when the MSb of HcFmNumber (bit 15) changes value, from 0 to 1 or from 1 to 0. |
| RHSC | 0b | R/W | R/W | RootHubStatusChange<br>This bit is set when the content of HcRhStatus or the content of any of HcRhPortStatus [NumberofDownstreamPort] has changed. |

FIG. 8E

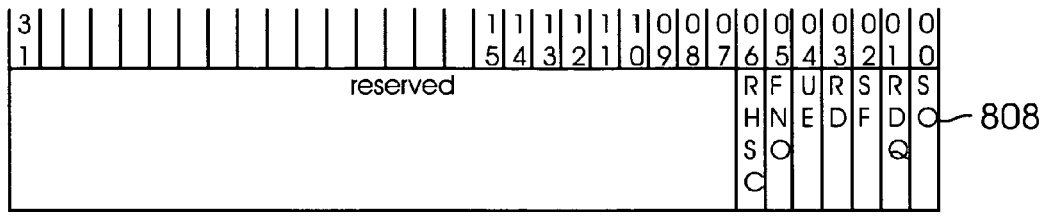

| Key | Reset | Read/Write | | Description |
|-----|-------|------|----|-------------|
|     |       | HCD  | HC |             |
| SO   | 0b | R/W | R | 0-Ignore<br>1- Enable interrupt generation due to Scheduling Overrun. |
| RDQ  | 0b | R/W | R | 0-Ignore<br>1- Enable interrupt generation due to HcDoneHead Writeback. |
| SF   | 0b | R/W | R | 0-Ignore<br>1- Enable interrupt generation due to Start of Frame. |
| RD   | 0b | R/W | R | 0-Ignore<br>1- Enable interrupt generation due to Resume Detect. |
| UE   | 0b | R/W | R | 0-Ignore<br>1- Enable interrupt generation due to Unrecoverable Error. |
| FNO  | 0b | R/W | R | 0-Ignore<br>1- Enable interrupt generation due to Frame Number Overflow. |
| RHSC | 0b | R/W | R | 0-Ignore<br>1- Enable interrupt generation due to Root Hub Status Change. |

FIG. 8F

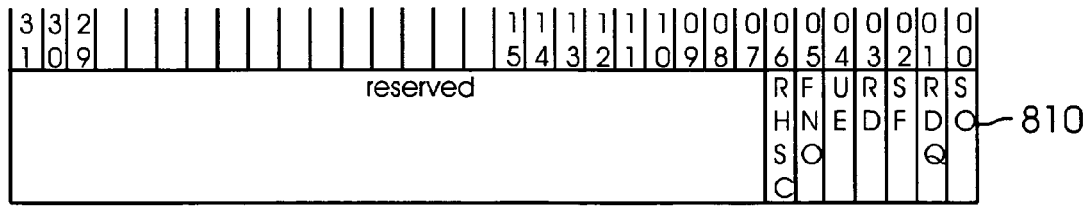

| Key | Reset | Read/Write | | Description |
|-----|-------|------------|---|-------------|
| | | HCD | HC | |
| SO | 0b | R/W | R | 0-Ignore<br>1- Disable interrupt generation due to Scheduling Overrun. |
| RDQ | 0b | R/W | R | 0-Ignore<br>1- Disable interrupt generation due to HcDoneHead Writeback. |
| SF | 0b | R/W | R | 0-Ignore<br>1-Disable interrupt generation due to Start of Frame. |
| RD | 0b | R/W | R | 0-Ignore<br>1- Disable interrupt generation due to Resume Detect. |
| UE | 0b | R/W | R | 0-Ignore<br>1- Disable interrupt generation due to Unrecoverable Error. |
| FNO | 0b | R/W | R | 0-Ignore<br>1- Disable interrupt generation due to Frame Number Overflow. |
| RHSC | 0b | R/W | R | 0-Ignore<br>1- Disable interrupt generation due to Root Hub Status Change. |
| MIE | 0b | R/W | R | A '0' written to this field is ignored by HC. A '1' written to this field disables interrupt generation due to events specified in the other bits of this register. This field is set after a hardware or software reset. |

FIG. 8G

| 31 | | | | | | | | | | | | | | | | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| ETD15Y | ETD14Y | ETD13Y | ETD12Y | ETD11Y | ETD10Y | ETD9Y | ETD8Y | ETD7Y | ETD6Y | ETD5Y | ETD4Y | ETD3Y | ETD2Y | ETD1Y | ETD0Y | ETD15X | ETD14X | ETD13X | ETD12X | ETD11X | ETD10X | ETD9X | ETD8X | ETD7X | ETD6X | ETD5X | ETD4X | ETD3X | ETD2X | ETD1X | ETD0X |

— 812

| Key | Reset | Read/Write | | Description |
|---|---|---|---|---|
| | | HCD | HC | |
| ETDnX | 0b | R/W | W | When this bit is '1', it indicates that X mega-buffer of ETDn (n=0 to 15) has generated an interrupt |
| ETDnY | 0b | R/W | W | When this bit is '1', it indicates that Y mega-buffer of ETDn (n=0 to 15) has generated an interrupt |

| 31 | | | | | | | | | | | | | | | | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | | | | | | | | | | | | | | E15 | E14 | E13 | E12 | E11 | E10 | E9 | E8 | E7 | E6 | E5 | E4 | E3 | E2 | E1 | E0 |

— 814

| Key | Reset | Read/Write | | Description |
|---|---|---|---|---|
| | | HCD | HC | |
| En | 0b | R/W | R | 0- Ignore<br>1- Enable interrupt generation due to ETD n (n=0 to 15). |

| | | | Read/Write | | Description |
|---|---|---|---|---|
| Key | Reset | HCD | HC | Description |
| Dn | 0b | R/W | R | 0-Ignore<br>1- Disable interrupt generation due to ETD n (n=0 to 15). |

FIG. 8K

| | | Read/Write | | Description |
|---|---|---|---|---|
| Key | Reset | HCD | HC | Description |
| StartAddress | 0000b | R/W | R | Defines the physical start address of the HC's local memory for either ETD or Data. |
| D | 0b | R/W | R | Microprocessor access direction (read/ write). 0=read, 1=write. |
| T | 0b | R/W | R | 0: ETD phase;<br>1: Data phase; |

FIG. 8L

| | | Read/Write | | Description |
|---|---|---|---|---|
| Key | Reset | HCD | HC | Description |
| FnX | 0b | R/W | R | 0-not filled<br>1- X mega- buffer of ETD n (n=0 to 15) is filled. |
| FnY | 0b | R/W | R | 0-not filled<br>1- Y mega- buffer of ETD n (n=0 to 15) is filled. |

FIG. 8M

| 31 | | | | | | | | | | | | | | | | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| FS15Y | FS14Y | FS13Y | FS12Y | FS11Y | FS10Y | FS9Y | FS8Y | FS7Y | FS6Y | FS5Y | FS4Y | FS3Y | FS2Y | FS1Y | FS0Y | FS15X | FS14X | FS13X | FS12X | FS11X | FS10X | FS9X | FS8X | FS7X | FS6X | FS5X | FS4X | FS3X | FS2X | FS1X | FS0X |

— 822

| Key | Reset | Read/Write | | Description |
|---|---|---|---|---|
| | | HCD | HC | |
| FSnX | 0b | R/W | R | 0-not effect<br>1- sets the FnX bit in HcXY BufferFilled register. |
| FSnY | 0b | R/W | R | 0-not effect<br>1- sets the FnY bit in HcXY BufferFilled register. |

| 31 | | | | | | | | | | | | | | | | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| FC15Y | FC14Y | FC13Y | FC12Y | FC11Y | FC10Y | FC9Y | FC8Y | FC7Y | FC6Y | FC5Y | FC4Y | FC3Y | FC2Y | FC1Y | FC0Y | FC15X | FC14X | FC13X | FC12X | FC11X | FC10X | FC9X | FC8X | FC7X | FC6X | FC5X | FC4X | FC3X | FC2X | FC1X | FC0X |

— 824

| Key | Reset | Read/Write | | Description |
|---|---|---|---|---|
| | | HCD | HC | |
| FCnX | 0b | R/W | R | 0-not effect<br>1- clears the FnX bit in HcXYBufferFilled register |
| FCnY | 0b | R/W | R | 0-not effect<br>1- clears the FnY bit in HcXYBufferFilled register |

| 31 | | | | | | | | | | | | | | | | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| reserved | | | | | | | | | | | | | | | | E | E | E | E | E | E | E | E | E | E | E | E | E | E | E | E |

— 825

| Key | Reset | Read/Write | | Description |
|---|---|---|---|---|
| | | HCD | HC | |
| E | 0h | R/W | R | A value of '1' enables the corresponding ETD<br>A value of '0' has no effect on the state of the corresponding ETD |

```
 3                               1 1 1 1 1 1                         0 ─ 827
 1                               5 4 3 2 1 0 9 8 7 6 5 4 3 2 1 0
           reserved              D D D D D D D D D D D D D D D D
                                                                      828
```

| Key | Reset | Read/Write HCD | HC | Description |
|-----|-------|----------------|----|-------------|
| D   | 0h    | R/W            | R  | A value of '1' disables the corresponding ETD. A value of '0' has no effect on the state of the corresponding ETD |

FIG. 8Q

```
 3                               1 1 1 1 1 1                         0 ─ 829
 1                               5 4 3 2 1 0 9 8 7 6 5 4 3 2 1 0
           reserved              E E E E E E E E E E E E E E E E
                                                                      830
```

| Key | Reset | Read/Write HCD | HC  | Description |
|-----|-------|----------------|-----|-------------|
| E   | 0h    | R              | R/W | A value of '1' indicates that the corresponding ETD is enabled. A value of '0' indicates that the corresponding ETD is not enabled. |

FIG. 8R

```
 3                               1 1 1 1 1 1                         0 ─ 831
 1                               5 4 3 2 1 0 9 8 7 6 5 4 3 2 1 0
           reserved              E Reser-  Source  reserved  Sink ETD
                                 N ved     ETD
                                                                      832
```

| Key | Reset | Read/Write HCD | HC | Description |
|-----|-------|----------------|----|-------------|
| Sink ETD | 0 | R/W | R | The index of the ETD that is assigned as the sink of the direct routing. Must be an OUT endpoint. |
| Source ETD | 0 | R/W | R | The index of the ETD that is assigned as the source of the direct routing. Must be an IN endpoint. |
| EN | 0b | R/W | R | When '1', the direct routing is enabled. |

FIG. 8S

| | 3 1 | | | | | | | | | | | | | | | | 1 5 | 1 4 | 1 3 | 1 2 | 1 1 | 1 0 | 9 | 8 | 7 | 6 | 5 | 4 | 3 | 2 | 1 | 0 | — 833 |
|---|---|---|---|---|---|---|---|---|---|---|---|---|---|---|---|---|---|---|---|---|---|---|---|---|---|---|---|---|---|---|---|---|---|
| | reserved | | | | | | | | | | | | | | | | I | I | I | I | I | I | I | I | I | I | I | I | I | I | I | I | 834 |

| Key | Reset | Read/Write | | Description |
|---|---|---|---|---|
| | | HCD | HC | |
| I | 0h | R/W | R | ImmediateInterruptEnabler<br>A '1' means that the retirement of this ETD will trigger an immediate interrupt. |

FIG. 8T

| | 3 1 | | | | | | | | | | | | | | | | 1 5 | 1 4 | 1 3 | 1 2 | 1 1 | 1 0 | 9 | 8 | 7 | 6 | 5 | 4 | 3 | 2 | 1 | 0 | — 835 |
|---|---|---|---|---|---|---|---|---|---|---|---|---|---|---|---|---|---|---|---|---|---|---|---|---|---|---|---|---|---|---|---|---|---|
| | reserved | | | | | | | | | | | | | | | | D | D | D | D | D | D | D | D | D | D | D | D | D | D | D | D | 836 |

| Key | Reset | Read/Write | | Description |
|---|---|---|---|---|
| | | HCD | HC | |
| D | 0h | R | R/W | Done<br>When a TD is completed, HC writes its corresponding bit to 1. This is set to zero whenever HC writes the content of this register to HcDoneQueue. It also sets the ReadbackDoneQueue of HcInterruptStatus. |

FIG. 8U

| 3 1 | 3 0 | | | | | | | | | | | | | | 1 6 | 1 5 | 1 4 | 1 3 | | | | | | | | | | | | 0 | — 837 |
|---|---|---|---|---|---|---|---|---|---|---|---|---|---|---|---|---|---|---|---|---|---|---|---|---|---|---|---|---|---|---|---|
| F I T | Reserved | | | | | | | | | | | | | | | | | F1 | | | | | | | | | | | | | 838 |

| Key | Reset | Read/Write | | Description |
|---|---|---|---|---|
| | | HCD | HC | |
| F1 | 2EDFh | R/W | R | FrameInterval<br>This specifies the interval between two consecutive SOFs in bit times. The nominal value is set to be 11,999.<br>HCD should store the current value of this field before resetting HC. By setting the HostControllerReset field of HcCommandStatus as this will cause the HC to reset this field to its nominal value. HCD may choose to restore the stored value upon the completion of the Reset sequence. |
| FIT | 0b | R/W | R | FrameIntervalToggle<br>HCD toggles this bit whenever it loads a new value to FrameInterval |

FIG. 8V

| 31 30 | | | | 15 | 14 | 13 | | 0 0 | 839 |
|---|---|---|---|---|---|---|---|---|---|
| Reserved | | | | FRT | | | FR | | 840 |

| Key | Reset | Read/Write | | Description |
|---|---|---|---|---|
| | | HCD | HC | |
| FR | 0h | R | R/W | FrameRemaining<br>This counter is decremented at each bit time. When it reaches zero, it is reset by loading the FrameInterval value specified in HcFmInterval at the next bit time boundary. When entering the UsbOperational state, HC re-loads the content with the FrameInterval of HcFmInterval and uses the update value from the next SOF. |
| FRT | 0b | R | R/W | FrameRemainingToggle<br>This bit is loaded from the FrameIntervalToggle field of HcFmInterval whenever FrameRemaining reaches 0. This bit is used by HCD for the sychronization between FrameInterval and FrameRemaining. |

FIG. 8W

| 31 | | 16 | 15 | | 0 0 | 841 |
|---|---|---|---|---|---|---|
| reserved | | | F | FN | | 842 |

| Key | Reset | Read/Write | | Description |
|---|---|---|---|---|
| | | HCD | HC | |
| FN | 0h | R | R/W | FrameNumber<br>This is incremented when HcFmRemaining is re-loaded. It will be rolled over to 0h after ffffh. When entering the UsbOperational state, this will be incremented automatically. After each increment, HC will set the StartofFrame in HcInterruptStatus. |

FIG. 8X

| 31 | | 12 | 11 | | 0 0 | 843 |
|---|---|---|---|---|---|---|
| reserved | | | | LST | | 844 |

| Key | Reset | Read/Write | | Description |
|---|---|---|---|---|
| | | HCD | HC | |
| LST | 0628h | R/W | R | LSThreshold<br>This field contains a value which is compared to the FrameRemaining field prior to initiating a Low Speed transaction. The transaction is started only if FrameRemaining ≥ this field. The value is calculated by HCD with the consideration of transmission and setup overhead. |

FIG. 8Y

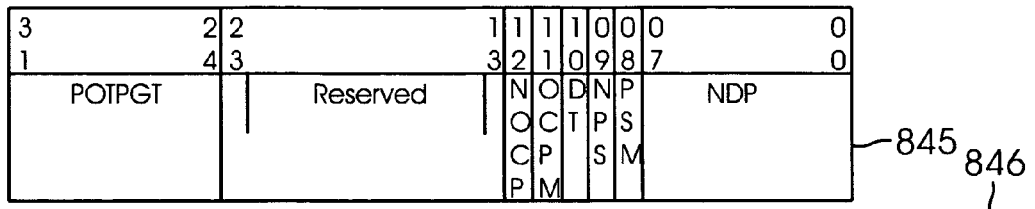

| Field | Power On Reset | Read/Write HCD | Read/Write HC | Description |
|---|---|---|---|---|
| NDP | 03H | R | R | NumberDownstreamPorts<br>These bits specify the number of downstream ports supported by the Root Hub This chip implements 3 ports. Depending on the working mode, the actual number of downstream ports are 3 or 2. |
| NPS | 0b | R | R | NoPowerSwitching<br>These bits are used to specify whether power switching is supported or ports are always powered. If this bit is cleared then the ports are power switched. |
| PSM | 1b | R | R | PowerSwitchingMode<br>This bit is used to specify how the power switching of the Root Hub ports are controlled. Each port is powered individually. This mode allows port power to be controlled by per-port switching. If the PortPowerControlMask bit is set, the port responds only to port power commands (Set/ClearPortPower). This implementation uses gang-power control. |
| DT | 0b | R | R | DeviceType<br>This bit specifies that Root Hub is not a compound device. The Root Hub is not permitted to be a compound device. |
| OCPM | 0b | R | R | OverCurrentProtectionMode<br>This bit describes how the over current status for the Root Hub ports are reported. This implementation uses gang-power and gang-overcurrent reporting. |
| NOCP | 0b | R | R | NoOverCurrentProtection<br>This bit describes how the overcurrent status for the Root Hub ports are reported. In this implementation, the over-current status is reported collectively for all downstream ports. |
| POTPGT | 1b | R/W | R | PowerOnToPowerGoodTime<br>This byte specifies the duration the HCD has to wait before accessing a powered-on port of the Root Hub. The unit of time is 2 ms. The duration is calculated as POTPGT* 2 ms. This value depends on the power switching circuit on the PCB. |

FIG. 8Z

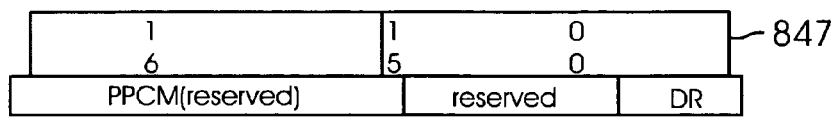

| Field | Power On Reset | Read/Write HCD | Read/Write HC | Description |
|---|---|---|---|---|
| DR | 0h | R | R | DeviceRemovable<br>Each bit is dedicated to a port of the Root Hub. When cleared, the attached device is removable. When set, the attached device is not removable. In this implementation, all attached devices are removable.<br>    bit 0: this port can be port (during HNP negotiation) host port only, or function port only.<br>    bit 1: Device attached to Port #1<br>    bit 2: Device attached to Port #2 |
| PPCM | 110h | R | R | PortPowerControlMask<br>Each bit indicates if a port is affected by a global power control command when PowerSwitchingMode is set. When set, the port's power state is only affected by per-port power control (Set/ClearPortPower).<br>    bit 0: this port can be OTG port (during HNP negotiation), host port only, or function port only<br>    bit 1: Ganged-power mask on Port#1<br>    bit 2: Ganged-power mask on Port#2 |

FIG. 9A

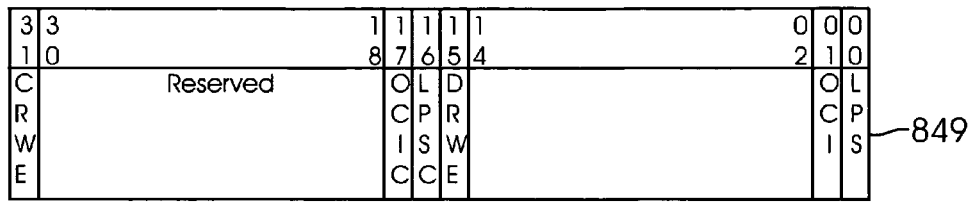

| | | 3 1 | 3 0 | | | | | 1 8 | 1 7 | 1 6 | 1 5 | 1 4 | | | 0 2 | 0 1 | 0 0 |
|---|---|---|---|---|---|---|---|---|---|---|---|---|---|---|---|---|---|
| | | C R W E | Reserved | | | | | O C I | L P S C | D R W E | | | | | O C I | L P S | |

849

850

| Field | Root Hub Reset | Read/Write HCD | Read/Write HC | Description |
|---|---|---|---|---|
| LPS | 0b | R | R | (read) LocalPowerStatus<br>The Root Hub does not support the local power status feature, thus this bit is always read as '0'. |
| OCI | 0b | R | R/W | OverCurrentIndicator<br>This bit reports overcurrent conditions when the global reporting is implemented. When set, an overcurrent condition exists. When cleared, all power operations are normal. |
| DRWE | 0b | R/W | R | (read) DeviceRemoteWakeupEnable<br>This bit enables a ConnectStatusChange bit as a resume event, causing a UsbSuspend to UsbResume state transition and setting the ResumeDetected interrupt.<br>0 = ConnectStatusChange is not a remote wake up event.<br>1 = ConnectStatusChange is a remote wake up event.<br>(write) Set RemoteWakeupEnable<br>Writing a '1' sets DeviceRemoveWakeupEnable. Writing a '0' has no effect. |
| LPSC | 0b | R | R | (read) LocalPowerStatusChange<br>The Root Hub does not support the local power status feature, thus this bit is alway read as '0'. |
| CCIC | 0b | R/W | R/W | OverCurrentIndicatorChange<br>This bit is set by hardware when a change has occurred to the OCI field of this register. The HCD clears this bit writing a '1'. Writing a '0' has no effect. |
| CRWE | | W | R | (write) ClearRemoteWakeupEnable<br>Writing a '1' clears DeviceRemoteWakeupEnable.<br>Writing a '0' has no effect. |

FIG. 9B

| 3 1 | | | | | | 2 1 | 2 0 | 1 9 | 1 8 | 1 7 | 1 6 | 1 5 | | | | | | 1 0 | 0 9 | 0 8 | 0 7 | | | 0 5 | 0 4 | 0 3 | 0 2 | 0 1 | 0 0 |
|---|---|---|---|---|---|---|---|---|---|---|---|---|---|---|---|---|---|---|---|---|---|---|---|---|---|---|---|---|---|
| Reserved | | | | | | PRSC | OCIC | PSSC | PESC | CSC | Reserved | | | | | | | LSDA | PPS | Rsvd | | | | PRS | OCS | PSS | PES | CCS | —851 |

852

| Field | Root Hub Reset | Read/Write HCD | Read/Write HC | Description |
|---|---|---|---|---|
| CCS | 0b | R/W | R/W | (read) CurrentConnectStatus<br>This bit reflects the current state of the downstream port.<br>0 = no device connected<br>1 = device connected<br>(write) ClearPortEnable<br>The HCD writes a '1' to this bit to clear the PortEnableStatus bit. Writing a '0' has no effect.<br>The CurrentConnectStatus is not affected by any write. |
| PES | 0b | R/W | R/W | (read) PortEnableStatus<br>This bit indicates whether the port is enabled or disabled. The Root Hub may clear this bit when an overcurrent condition, disconnect event, switched-off power, or operational bus error such as babble is detected. This change also causes PortEnableStatusChange to be set. The HCD sets this bit by writing SetPortEnable and clears it by writing The ClearPortEnable. This bit cannot be set when CurrentConnectStatus is cleared. This bit is also set, if not already, at the completion of a port reset when ResetStatusChange is set or port suspend when SuspendStatusChange is set.<br>0 = port is disabled<br>1 = port is enabled<br>(write) SetPortEnable<br>The HCD sets PortEnableStatus by writing a '1'. Writing a '0' has no effect. If CurrentConnectStatus is cleared, this write does not set PortEnableStatus, but instead sets ConnectStatusChange. This informs the driver that it attempted to enable a disconnected port. |
| PSS | 0b | R/W | R/W | (read) PortSuspendStatus |

| (a) | (b) | (c) | (d) | (e) | |
|---|---|---|---|---|---|
| | | | | | This bit indicates the port is suspended or in the resume sequence. It is set by a SetSuspendState write, and cleared when PortSuspendStatusChange is set at the end of the resume interval. This bit cannot be set if CurrentConnectStatus is cleared. This bit is also cleared when PortResetStatusChange is set at the end of the port reset or when the HC is placed in the UsbResume state. If an upstream resume is in progress, it should propagate to the HC.<br>        0 = port is not suspended<br>        1 = port is suspended<br>(write) SetPortSuspend<br>The HCD sets PortSuspendStatus bit by writing a '1' to this bit. Writing a '0' has no effect. If CurrentConnectStatus is cleared, this write does not set PortSuspendStatus; instead it sets ConnectStatusChange. This informs the driver that it attempted to suspend a disconnected port. |
| POCI | 0b | R/W | R/W | | (read) PortOverCurrentIndicator<br>Overcurrent from any port will set this bit to 1.<br>(write) ClearSuspendStatus<br>The HCD writes a '1' to initiate a resume. Writing a '0' has no effect. A resume is initiated only if PortSuspendStatus is set. |
| PRS | 0b | R/W | R/W | | (read) PortResetStatus<br>When this bit is set by a write to SetPortReset, port reset signaling is asserted. When reset is completed, this bit is cleared when PortResetStatusChange is set. This bit cannot be set if CurrentConnectStatus is cleared.<br>        0 = port reset signal is not active<br>        1 = port reset signal is active<br>(write) SetPortReset<br>The HCD sets the port reset signaling by writing a '1' to this bit. Writing a '0' has no effect. If CurrentConnectStatus is cleared, this write does not set PortResetStatus, but instead sets ConnectStatusChange. This informs the driver that it attempted to reset a disconnected port. |

FIG. 9C(ii)

| | | | | | |
|---|---|---|---|---|---|
| PPS | 0b | R/W | R/W | (read) PortPowerStatus<br>This bit reflects the port's power status, regardless of the type of power switching implemented. This bit is cleared if an overcurrent condition is detected. The HCD sets this bit by writing SetPortPower. The HCD clears this bit by writing ClearPortPower. When port power is disabled, CurrentConnectStatus, PortEnableStatus, PortSuspendStatus, and PortResetStatus should be reset.<br>    0 = port power is off<br>    1 = port power is on<br>(write) SetPortPower<br>The HCD writes a '1' to set the PortPowerStatus bit.<br>Writing A '0' Has no effect. | |
| LSDA | Xb | R/W | R/W | (read) LowSpeedDeviceAttached<br>This bit indicates the speed of the device attached to this port. When set, a Low Speed device is attached to this port. When clear, a Full Speed device is attached to this port. This field is valid only when the CurrentConnectStatus is set.<br>    0 = full speed device attached<br>    1 = low speed device attached<br>(write) ClearPortPower<br>The HCD clears the PortPowerStatus bit by writing a '1' to this bit.<br>Writing a '0' has no effect. | |
| CSC | 0b | R/W | R/W | ConnectStatusChange<br>This bit is set whenever a connect or disconnect event occurs. The HCD writes a '1' to clear this bit. Writing a '0' has no effect. If CurrentConnectStatus is cleared when a SetPortReset, SetPortEnable, or SetPortSuspend write occurs, this bit is set to force the driver to reevaluate the connection status since these writes should not occur if the port is disconnected.<br>    0 = no change in CurrentConnectStatus<br>    1 = change in CurrentConnectStatus | |

FIG. 9C(iii)

FIG. 9C(iv)

| 9C(i) |
| 9C(ii) |
| 9C(iii) |
| 9C(iv) |

SYSTEM AND METHOD FOR USB CONTROLLERS

CROSS REFERENCE TO RELATED APPLICATIONS

This application is related to the provisional U.S. patent application entitled, "METHOD FOR A MICROPROCESSOR TO COMMUNICATE WITH A PERIPHERAL CONTROLLER AND TRANSFER-LEVEL USB HOST CONTROLLER", Ser. No. 60/277,093, filing date, Mar. 19, 2001, the disclosure of which is incorporated herein by reference, in its entirety and is a divisional application of application Ser. No. 10/100,482 filed Mar. 18, 2002 now U.S. Pat. No. 7,035,948.

BACKGROUND OF THE INVENTION

1. Field of the Invention

The present invention relates to peripheral device controllers, and more particularly, to controllers used in a universal serial bus ("USB") system.

2. Background

The USB system provides a unitary interface that allows various devices to be connected to a computer system (also referred to as a host system). USB enables a wide variety of peripherals to be connected in a tree-like fashion through a physical connector at the host side. USB systems comply with the USB specification, version 2.0, published Apr. 27, 2000, which is incorporated herein by reference in its entirety.

USB systems are implemented by a register level interface standard referred to as the "Open Host Controller Interface" ("OHCI"), developed by a consortium of computer industry manufacturers. The OHCI allows multiple Host Controllers to be used with a common software driver. The OHCI specification, version 1.0a, entitled "Open HCI Host Controller Interface Specification for USB, published by Compaq, Microsoft, and National Semiconductor, Jan. 22, 1997, is incorporated herein by reference in its entirety.

Yet another standard that is used by USB systems is the Universal Host Controller Interface ("UHCI") that implements a USB Host Controller. The UHCI provides hardware and software interface between a Host Controller software driver and the Host Controller. UHCI standard published by Intel Corporation, Revision 1.1, March 1996, is incorporated herein by reference in its entirety.

USB enables bi-directional isochronous and asynchronous data transfer making it possible to couple plural peripheral devices to a computing device via a single Host Controller and a USB hub. A USB hub is an intelligent wiring connector, coupled to a computing device or another hub, and which allows, attachment for peripheral devices.

USB systems allow automatic identification and configuration of external and/or internal peripheral devices. Typically, a USB host controller maintains a data structure that identifies every connected peripheral device and includes entries for communicating with the individual devices. The data structure manages four types of data transfers, between a host controller and peripheral units, namely, interrupt, isochronous, control and bulk transfers.

Interrupt transfers include small data transfers used to communicate information from a USB device to a client software at the host system. Isochronous transfers include periodic data transfers at a constant rate. Data transfer is correlated in time between a sender and receiver.

Control transfers are non-periodic data transfers used to communicate configuration/command/status information between client software and a USB device. Bulk transfers are non-periodic data transfers used to transfer large amounts of information between client software and a USB device.

USB systems use a microcontroller (also referred to as a host controller or USB controller), or an embedded microcontroller, uniquely suited on to a monolithic semiconductor substrate (chip) to interface between host systems and USB devices. The USB controller includes various features within a single chip, complying with the foregoing standards.

USB systems use Endpoint Descriptors (ED) and Transfer Descriptors (TD) for communication. Typically, a Host Controller Driver assigns an ED to each peripheral device (also referred to herein as an "endpoint") in the USB system. The ED includes information necessary for the host controller to communicate with the endpoint. The fields include maximum packet size, endpoint address, and speed of the endpoint and direction of data flow. A queue of TDs is linked to the ED for a specific endpoint. The TD includes information necessary to describe the data packets to be transferred. Each TD contains information that describes one or more data packets.

Section 4 of the OHCI specification describes the use of endpoint and transfer descriptors. Typically, a ED is a 16-byte, memory resident structure. A host controller traverses lists of EDs and if there are TDs linked to an ED, the host controller performs the indicated transfer.

Current USB controllers have various drawbacks. For example for bulk transfers, a host system builds a bulk transfer list structure in system memory which includes EDs and TDs. Under OHCI's bulk list structure, a host controller must queue and en-queue EDs and TDs depending upon whether they are active or inactive.

If Host Controller has to send bulk data, host controller must access the ED in system memory, compute the ED, access the TD, compute the TD and then transfer data according to the command. This requires elaborate bus mastering which is complex and slows the host system.

For isochronous transfer, conventional OHCI controllers require frequent access to the system bus. Isochronous transfer monopolizes system bus resources and hence overall system performance is affected.

Another drawback of conventional USB systems is that memory buffers are either under-run or over-run, and hence used inefficiently.

Therefore, there is a need for a host controller that allows efficient data transfer without monopolizing system bus resources.

There is also a need for an ED and TD format that does not require elaborate and complex bus mastering.

Also, there is a need for a buffering mechanism that efficiently utilizes the buffer resources.

SUMMARY OF THE INVENTION

In one aspect, the present invention provides a method for transferring information between a host system and a USB Host Controller in a USB system. The method includes partitioning a memory storage device into a first memory buffer and a second memory buffer; writing information in the second memory buffer, while information is read from the first memory buffer; wherein the size of the first and second memory buffer may be programmed by the host system and the first and/or second memory buffer may contain more than one USB packet. The first memory buffer and the second memory buffer may be equal or unequal in size.

The method includes a first pointer based on which an address from where data is read can be determined; and a second pointer based on which an address to where data is written can be determined. The USB Host Controller may read the first memory buffer and the second memory buffer may be written by the host system. Also, the first memory buffer may be read by the host system and the USB Host Controller may write the second memory buffer.

In another aspect, the present invention provides a system for transferring information between a host system and a USB Host Controller. The system includes a memory storage space that can be partitioned into a first memory buffer and a second memory buffer, wherein the size of the first and second memory buffer may be programmed by the host system and the and the first and/or second memory buffer may contain more than one USB packet; logic for maintaining a first pointer based on which the address of information to be read can be determined, and for a second pointer based on which the address of where data is to be written can be determined; and logic that updates the first and second pointer such that data is read/written in a specified sequence.

In yet another aspect, the present invention provides an apparatus for transferring information between a host system and a USB Host Controller. The apparatus includes a memory storage space that can be partitioned into a first memory buffer and a second memory buffer, wherein the size of the first and second memory buffer may be programmed by the host system and the and the first and/or second memory buffer may contain more than one USB packet; logic for maintaining a first pointer based on which the address of information to be read can be determined, and for a second pointer based on which the address of where data is to be written can be determined; and logic that updates the first and second pointer such that data is read/written in a specified sequence.

In yet another aspect the invention provides a USB Host Controller comprising of interface to a host system with control logic used for transferring data from the host system to the USB Host Controller is provided. The USB Host Controller includes memory storage space for storing at least one ETD containing information regarding a USB transfer; a link for determining a location in the memory storage space associated with the transfer specified by the ETD; and logic that executes ETDs in a specified priority order.

In another aspect, the USB Host Controller includes plural logic channels that share the same physical address and data bus at an interface between the host system and the USB Host Controller; and dataports used by the host system to address the logic channels to read and/or write data from/to the USB Host Controller, wherein the logic channels may be interleaved in plural ways.

In yet another aspect, the present invention provides a data packet format for USB systems for transferring data between a host system and a USB Host Controller coupled to plural devices. The format comprises of an ETD that includes an EndPoint Descriptor and a Transfer Descriptor, wherein the host system programs the parameters of a communication channel for a particular endpoint. The ETD includes plural transfer descriptors that may be a part of a single transaction. The host system sets up ETDs for plural endpoints and the USB Host Controller executes the ETDs.

In yet another aspect the present invention provides a system for transferring information between the host system and USB Host Controller. The system includes an ETD table that is setup by the host at a memory storage space in the USB Host Controller. The USB Host Controller enables the ETD using at least one operational register and includes a scheduler that scans the ETD table for executing ETDs.

In yet another aspect, the present invention provides a method for transferring data between a host system and a USB Host Controller. The method includes setting up an ETD table, wherein the ETD table is set up by the host system, enabled by at least one operational register and then loaded into a memory storage device at the USB Host Controller; scanning all ETDs at a start of frame; and executing the ETDs in a priority order.

In yet another aspect of the present invention, each ETD may be individually programmed for DMA or PIO mode. When an ETD is removed, the associated DMA channel is also dissolved. When the ETD is put on a DoneQueue, the corresponding working mode bit is also cleared. This means that the DMA channel association exists at the ETD (transfer) level. The freed DMA channel can be used for the next ETD of the same endpoint, or for another ETD. Hence, DMA channels are efficiently used to transfer data.

In yet another aspect of the present invention, the foregoing buffering techniques has advantages because it allows Host Controller to transfer data efficiently. For an endpoint working in the PIO mode, very few interrupts are required. For isochronous endpoint, packet size varies, and the adaptive nature of the present invention allows varying the size of number of packet per buffer and the size of the foregoing mega-buffers.

In yet another aspect of the present invention, local memory buffers may be programmed based on packet size and hence overrun and underrun situation can be handled efficiently.

In yet another aspect of the present invention, The ED format is the same for all endpoints, while the TDs may be different and packets are programmed accordingly. This reduces overhead between the host and Host Controller.

In yet another aspect of the present invention, since ETDs are written into local memory at the Host controller level, no special bus mastering is required. Also, only active ETDs are placed in local memory and hence they can be executed efficiently.

In yet another aspect of the present invention, since ETDs are transferred from local memory, system bus resources are used for other functions.

In yet another aspect of the present invention, the system is scalable based on local memory size and hence less taxing on address buses.

This brief summary has been provided so that the nature of the invention may be understood quickly. A more complete understanding of the invention can be obtained by reference to the following detailed description of the preferred embodiments thereof, in connection with the attached drawings.

BRIEF DESCRIPTION OF THE DRAWINGS

FIG. 4A shows the format of an Endpoint descriptor, according to one aspect of the present invention.

FIG. 4B shows a table describing the various fields shown in FIG. 4A, according to one aspect of the present invention.

FIG. 4E shows an example of a Control/Bulk Transfer descriptor, according to one aspect of the present invention.

FIG. 4F shows an example of an interrupt Transfer descriptor, according to one aspect of the present invention.

FIG. 4G describes the various fields illustrated in FIGS. 4E and 4F, according to one aspect of the present invention.

FIG. 4H shows an example of an isochronous Transfer descriptor, according to one aspect of the present invention.

FIG. 4I describes the various fields illustrated in FIG. 4H, according to one aspect of the present invention.

FIG. 4J shows an example of buffer length calculation, according to one aspect of the present invention.

FIG. 4K shows an example of an overrun buffer values.

FIG. 4L shows an example of a packet status, according to one aspect of the present invention.

FIG. 4M describes the various FIG. 4L fields, according to one aspect of the present invention.

FIG. 4N shows examples of completion codes, according to one aspect of the present invention.

FIG. 4O shows an example of an ETD table, according to one aspect of the present invention.

FIG. 8A shows a list of various operational registers used in the various adaptive aspects of the present invention.

FIGS. 8B-8Z show plural fields used by the registers of FIG. 8A and the tables showing associated field descriptions, according to one aspect of the present invention.

FIGS. 9A-9C show plural fields used by the registers of FIG. 8A and the tables showing the associated field descriptions, according to one aspect of the present invention.

Features appearing in multiple figures with the same reference numeral are the same unless otherwise indicated.

DETAILED DESCRIPTION OF THE PREFERRED EMBODIMENTS

Figure 1:
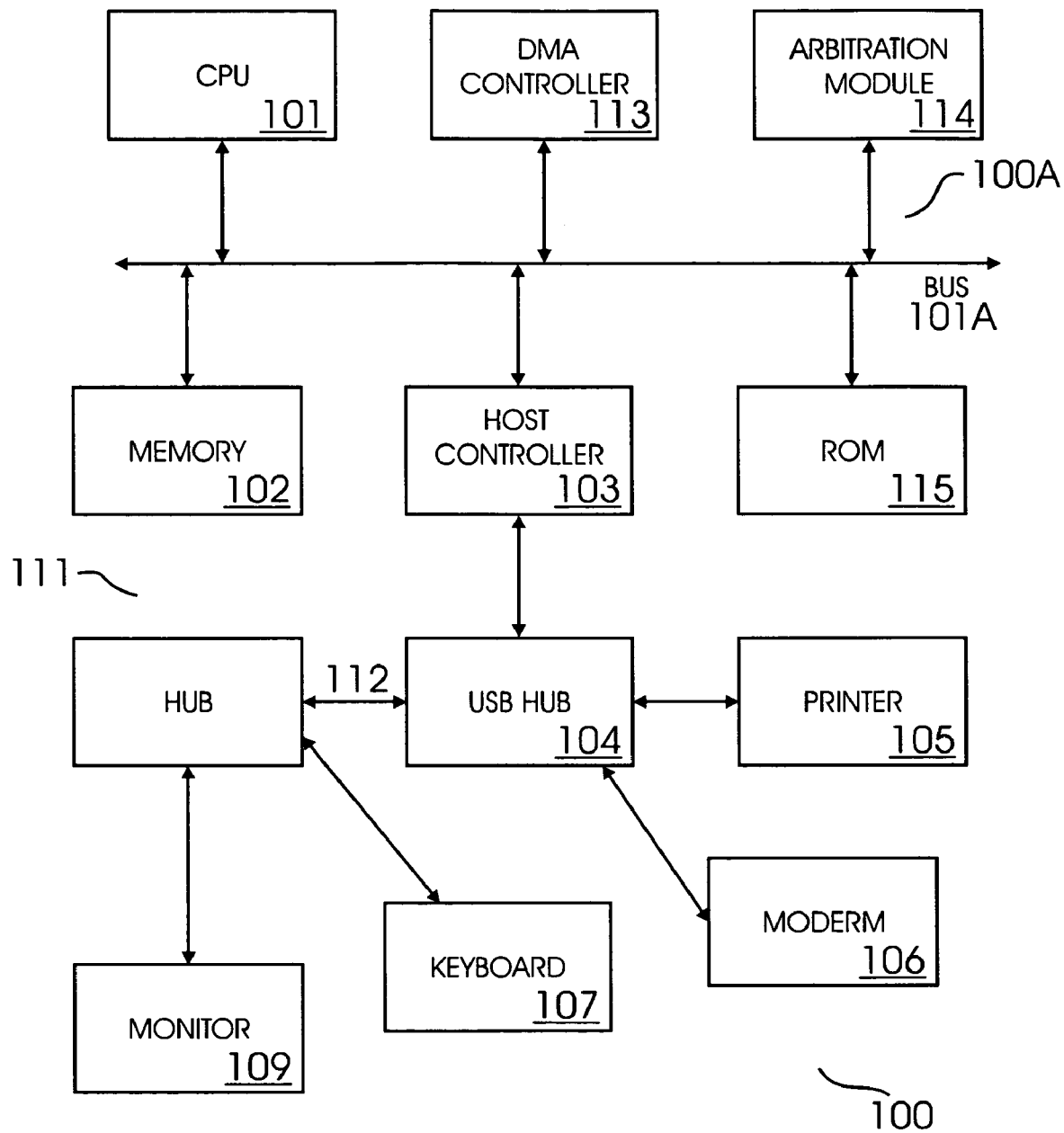
FIG. 1 shows a block diagram of a host system, according to one aspect of the present invention.

Definitions: The following definitions are used in various aspects of the present invention and with respect to the USB specification (but not exclusively):

"ACK": Handshake packet indicating positive acknowledgement.

"Active device": A device that is powered and is not in the Suspend State.

"Babble": Unexpected bus activity that persists beyond a specific point in a frame.

"Bit": A unit of information used by digital computers and represents the smallest piece of addressable memory. Typically represented by a value of one (1) or zero (o).

"Bit Stuffing": Insertion of a "0" bit into a data stream to cause an electrical transition on the data wires.

"CRC": Cyclic redundancy check performed on data to see if an error occurred during transmission.

"Device": A logical or physical entity that performs a function.

"Device Address": A seven bit value under USB that represents the unique address of a device.

"DMA": Direct Memory Access

"DWORD": Double word, i.e., a data element that is two words in size.

"Endpoint": A uniquely addressable portion of a USB device that is the source or sink of information in a communication flow between a host and the device.

"Endpoint Address": Combination of an endpoint number and endpoint direction on a USB device.

"Endpoint Descriptor" ("ED"): Data structure with information necessary for communication between a Host Controller and an endpoint.

"Endpoint Transfer descriptor" ("ETD"): Combined Data structure with ED and TD.

"Endpoint Direction": The direction of data transfer, i.e., either "IN" to the host, OR "OUT" from the host.

"EOF": End of Frame

"EOP": End of packet

"Host Controller" ("HC"): Host USB interface.

"Host Controller Driver" ("HCD"): USB software layer that abstracts Host Controller hardware.

"Hub": A USB device that provides additional connection to USB.

"LSb": Least significant bit.

"LSB": Least significant byte.

"MSb": Most significant bit.

"MSB": Most significant byte.

"NAK": Handshake packet indicating a negative acknowledgement.

"Packet": A bundle of data organized in-groups for transmission that contains information regarding control, data to be transferred, and error detection and correction bits.

"PIO": Programmable Input/Output

"PID": Field in a USB packet that indicates the type of packet.

"PLL": Phase locked loop.

"Polling": Asking multiple devices if they have any data to transmit.

"Queue": A linked list of TDs

"Root Hub": A USB hub directly coupled to the Host Controller.

"RPP": Relative Polling Position

"SOF": Start of Frame that allows endpoints to identify the start of a frame and synchronize internal endpoint checks to the host.

"Token Packet": A type of packet that identifies the type of transaction that is to be performed.

"Transfer": The delivery of service to an endpoint that includes a token packet, data packet and optional handshake packet.

"Transfer Descriptor" ("TD"): Data structure linked to an endpoint descriptor with transfer information.

"USB": Universal Serial Bus

"Word": A data element that is two bytes in size.

FIG. 1 is a block diagram of a USB system 100 with host system 100A connected to plural USB enabled peripheral devices via USB bus 111. Host system 100A may be a personal computer and, although not described in detail, includes a central processing unit (CPU) 101, that may be a Pentium class microprocessor, manufactured by Intel Corp. microprocessor or any other processor, and further includes volatile and non-volatile storage and input/output devices etc. Host system 100A is provided with a USB controller (Host Controller) 103 for controlling data transfers through bus 111.

All or any part of the foregoing units can be implemented as a computer program including instructions, which are stored on a digital data storage medium such as a magnetic disk or CD-ROM for distribution to end-users in accordance with the present invention. Further, any part of these units can be wholly or partially implemented in volatile memory, non-volatile memory or any combination thereof, prior and during operation.

Plural peripheral units, e.g., printer 105, modem 106, mouse 107, keyboard 108 and monitor 109 may be coupled to host system 100A via USB Root Hub 104.

USB controller 103 communicates with the peripheral units via USB bus 111 using four types of data transfers described above, namely interrupt, control, isochronous, and bulk transfers that are described above. USB bus 111 includes hub 110 coupled with line 112.

Host system 100A includes direct memory access ("DMA") controller 113 that allows access to DMA channels, as discussed below.

DMA controller units are used to perform transfers between memory locations, or between memory locations and an input/output port. DMA controller 113 functions without involving the microprocessor (CPU 101), by initializing control registers in the DMA unit with transfer control information. The transfer control information generally includes source address (the address of the beginning of a block of data to be transferred), the destination address, and the size of the data block. DMA controller 113 provides address and bus control signals to and from a storage device for a read and/or writes cycle.

Specific channels are implemented in a DMA controller 113 to allow storage devices to transfer data directly to and from memory storage devices. A channel can be activated by a DMA request signal (DREQ) from a storage device or Host Controller 103 (or 301). DMA controller 113 receives the DREQ, provides a DMA acknowledged signal (DACK), and transfers the data over the channel to or from the storage device.

Figure 2A:
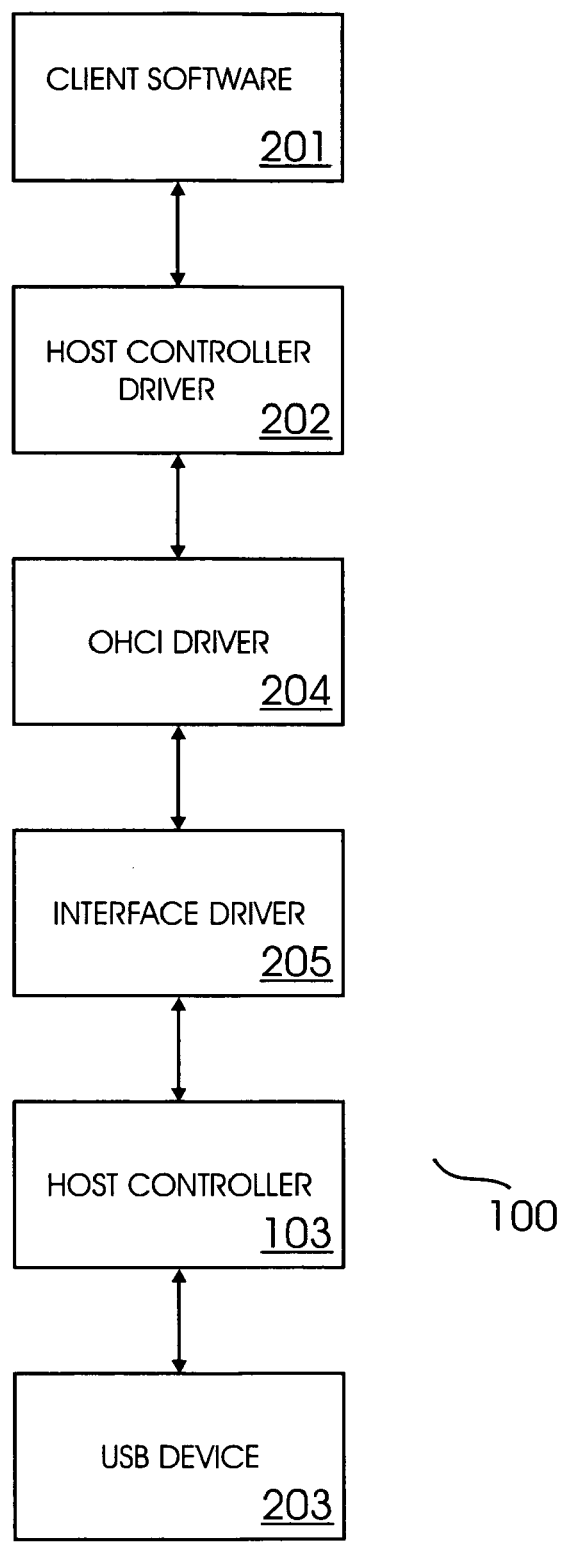
FIG. 2A shows a block diagram of various components of FIG. 1, according to one aspect of the present invention.

FIG. 2A shows another aspect of USB system 100 that uses the various components of FIG. 1. FIG. 2A shows Host Controller Driver 202 and Host Controller 103 that operate in tandem to transfer data between client software 201 and a USB device 203 (which may be any of the USB devices discussed above and shown in FIG. 1). The present system is adaptive, for example, if OHCI/UHCI compliance is required, then Host Controller Driver 202 includes an OHCI/UHCI driver 204 and an interface driver 205. If OHCI/UHCI compliance is not needed, a stand alone Host Controller Driver 202 may be used.

If Host Controller Driver 202 includes OHCI (or UHCI) driver with interface driver 205, then there is no direct communication between OHCI driver 204 and Host Controller 103. Interface driver 205 mediates all communications between the two.

Figure 2B:
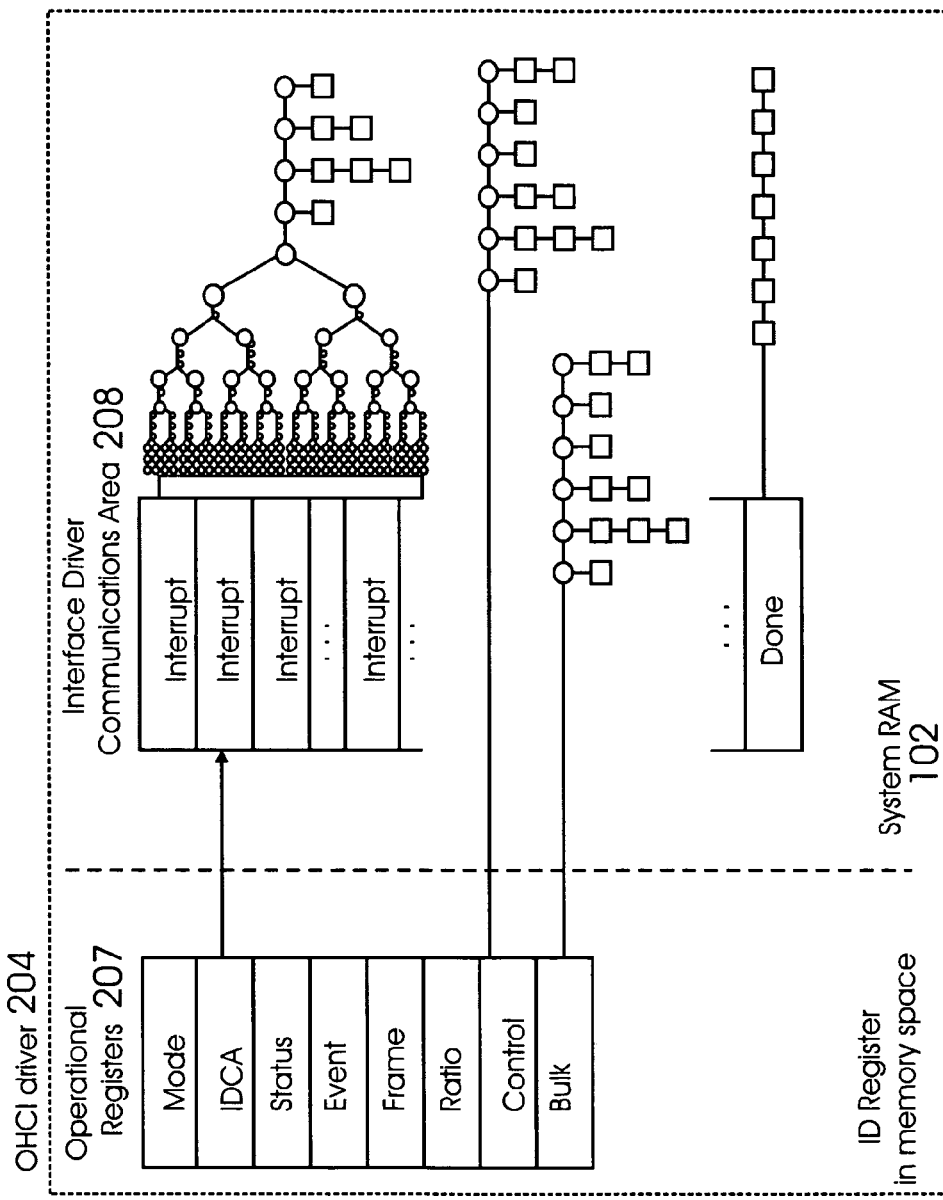
FIG. 2B shows a block diagram of an OHCI driver, according to one aspect of the present invention.

OHCI (or UHCI) driver 204 and interface driver 205 have plural communication channels. One such channel uses a set of standard OHCI/UHCI operational registers 207 as shown in FIG. 2B. The operational registers contain control, status and a list pointer registers. OHCI (or UHCI) driver 204 is the master of the first channel. Within the operational register set is a pointer to a location in system memory 102, which is designated as Interface Driver Communications Area ("IDCA") 208.

IDCA 208 is the second communication channel, where Interface Driver 205 is the master of the second channel. IDCA 208 includes head pointers to interrupt ED lists, the head pointer to a "done queue", and status information associated with start-of-frame ("SOF") processing.

Figure 2C:
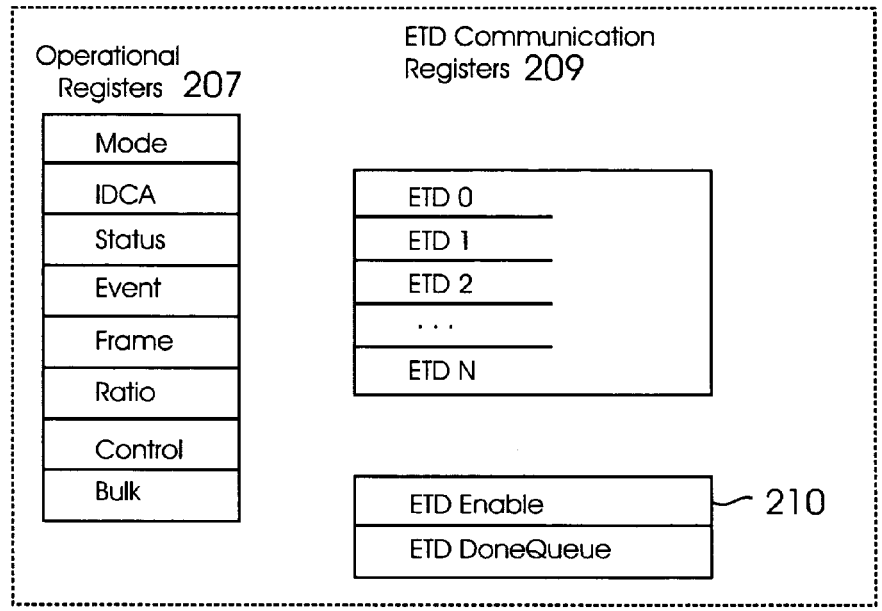
FIG. 2C shows a block diagram of an interface driver, according to one aspect of the present invention.
Figure 3:
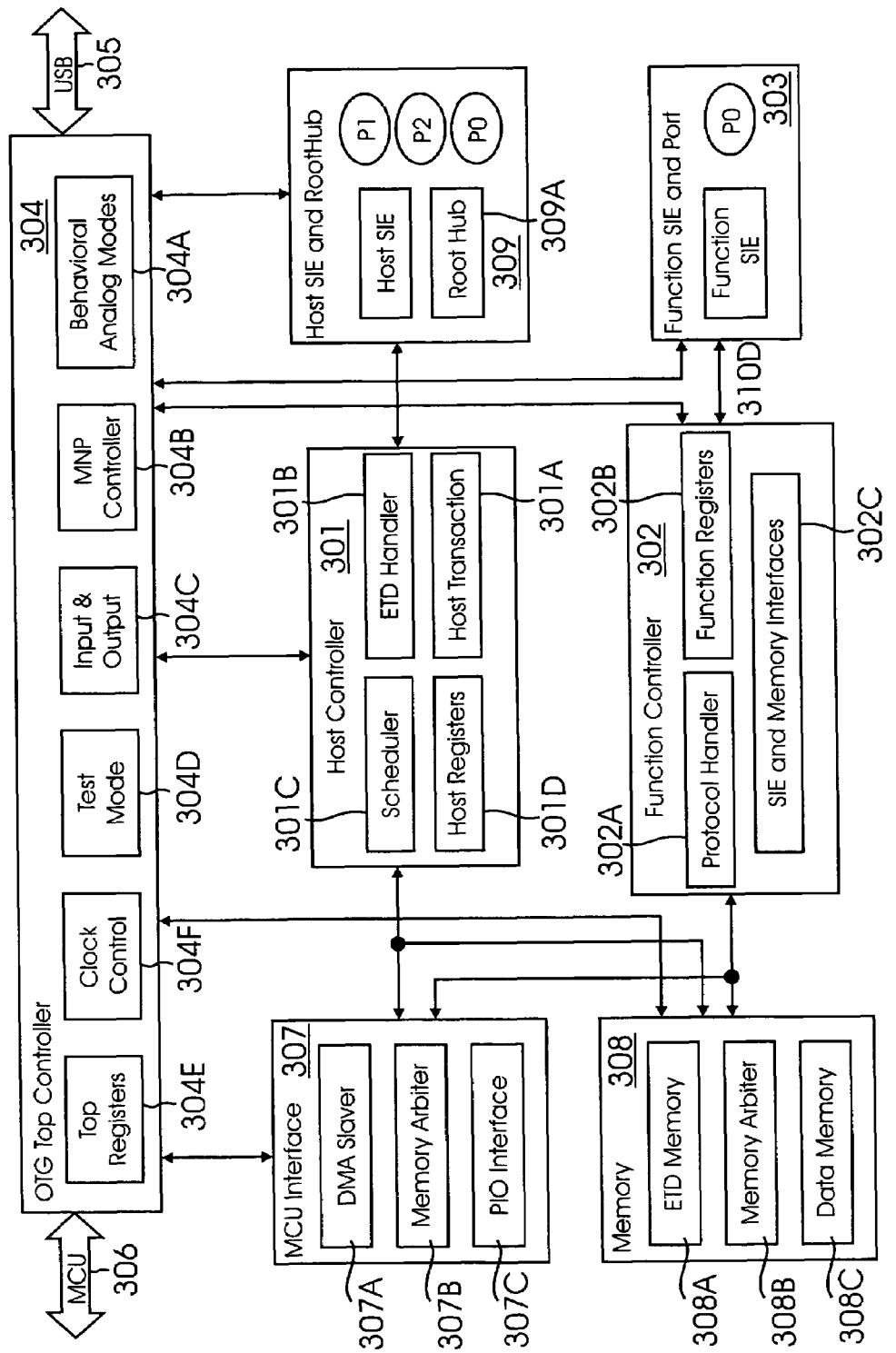
FIG. 3 shows a block diagram of a USB Host Controller, according to one aspect of the present invention.

Communication between Interface Driver 204 and Host Controller 103 (FIG. 2C): Plural communication channels are available for communication between interface driver 205 and Host Controller 103. One of the channels uses a set of operational registers located at Host Controller 103 (or 301, as shown in FIG. 3). The operational registers 207 contain control, status and pointers. The second communication channel is an ETD communication area 209, consisting of a list of ETDs constructed by interface driver 205 based on list structures located in ETD memory 308A, as described below.

OHCI enumerates each newly connected peripheral device; schedules appropriate service for each endpoint and put the schedule into memory 103. Interface driver 205 evaluates the schedule, constructs ETDs, and writes them into ETD tables located at ETD memory 308A for execution. Interface driver 205 is the master of the foregoing two channels. Each ETD contains sufficient information for Host Controller 103 (or 301) to operate at the appropriate time.

Figure 2D:
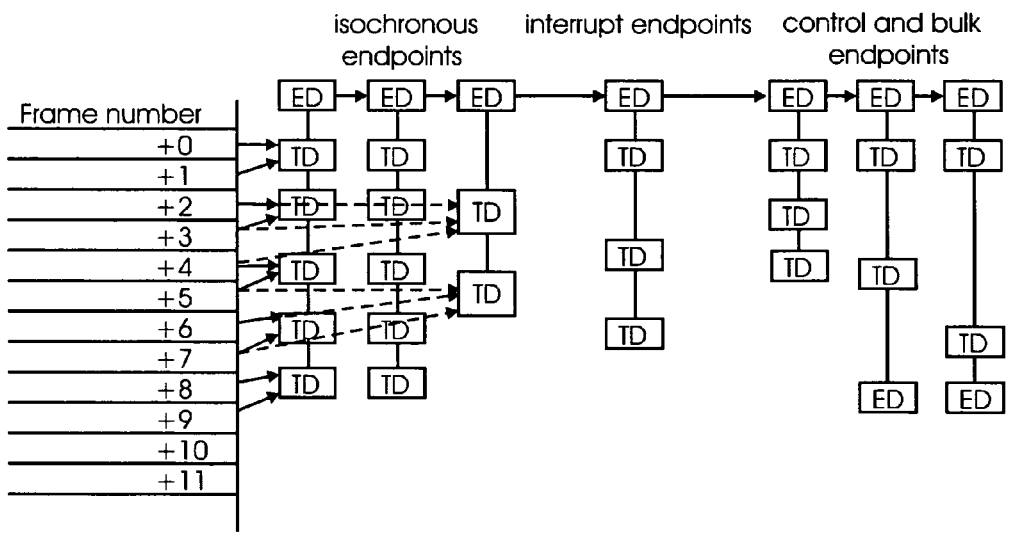
FIG. 2D is a timing chart showing execution of endpoint and transfer descriptors, according to one aspect of the present invention.
Figure 2E:
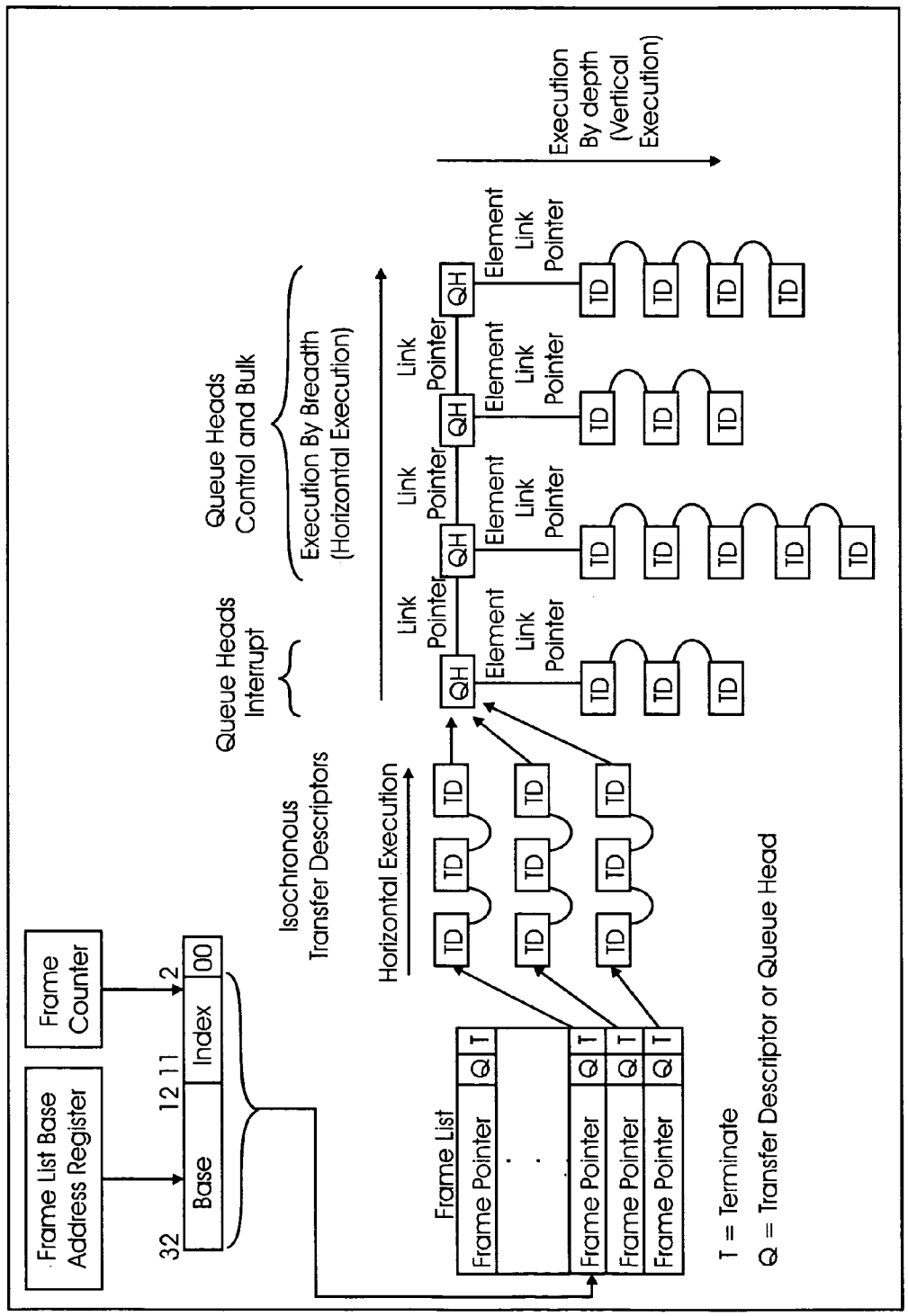
FIG. 2E is a block diagram showing execution of endpoint and transfer descriptors, according to one aspect of the present invention.

FIGS. 2D and 2E show an example of servicing ETDs, according to one aspect of the present invention. Vertical axis represents the time. Each ETD is setup in local memory 308 before it is executed. A TD can support more than one packet. When one TD is retired, it is put in the "Donequeue" described below, and a time deferred or immediate interrupt is generated. CPU 101 reads out status information, and writes the next TD. The vertical distance between two TDs represents the number of executed frames.

FIG. 3 is a top-level block diagram of the architecture of system 300 according to one aspect of the present invention. FIG. 3 includes a top-level controller 304 with plural modules, 304A through 304F that have various functions. Module 304B is a controller that controls Host Controller 301 (similar to Host controller 103) and function controller 302.

FIG. 3 also shows a local memory module 308 with ETD memory 308A, memory arbiter 308B and data memory 308C. ETD memory 308A includes ETD table lists (FIG. 4O). Memory arbiter 308B includes an arbitration module that arbitrates DMA access for any endpoint execution.

Also shown in system 300 is a microprocessor interface 307 that interfaces Host Controller 301 with CPU 101. This includes a DMA slayer 307A, memory arbiter 307B and a programmable input/output ("PIO") interface 307C.

Host controller 301 has plural logical communication channel interface with CPU 101 through interface 307, including one parallel I/O channel and "n" number of DMA channels. Each logic channel has a data port, which is mapped to a memory mapped I/O. The memory mapped I/O are accessed by plural operational registers described below. The logic channels may be interleaved and the data ports may be implemented with a pipeline resulting in a higher throughput. This allows word for word and burst access consisting of one address phase and multiple data phase.

In one aspect of the present invention plural logic channels are used between CPU 101 and Host Controller 301, including memory-mapped Input/Output channel for direct access, DMA channel 0 and DMA channel 1 (not shown) through interface 307. The three logic channels share the same address and data bus and may be interleaved. During the data phase, CPU 101 reads/writes from system memory to Host Controller 301 through a Dataport register (described below), and DMA channel 0 transfers data between system memory 102 and local memory 308 using DataPort0(1) register 851, described below with respect to FIG. 9C.

System 300 includes ETD handler 301A in Host Controller 301, which maintains an updated list of ETD transactions. Host registers 301D maintain plural fields as discussed below. Schedule 301C uses memory arbiter 307B and 308B, to schedule ETD executions. Host Controller 301 is coupled to root hub 309A (similar to Root Hub 104) to which plural devices may be coupled.

Data Structures

In one aspect of the present invention, a data structure is provided that allows efficient communication between host system 100A and a USB device (e.g. device 203). The data structure is referred to as Endpoint and Transfer Descriptor ("ETD") that allows communication between Host Controller Driver 202 and Host Controller 103. Host Controller Driver 202 assigns a ED to each endpoint (or a device) in system 100. The ED includes information relating to maximum data packet size, endpoint address, endpoint speed, and direction of data flow. EDs together with Transfer descriptors are placed in an ETD table (FIG. 4O) located at ETD memory 308A.

Host Controller Driver 202 manages operation of Host Controller 301 by communicating with various operational registers 301D, described below, builds and downloads ETDs from system memory 102 into local memory 308 for execution.

As discussed in detail below, data transfer requires Host Controller Driver 202 to write appropriate data into memory 308 and then data is sent to an endpoint as addressed by the ED. When data is received from an endpoint, it is stored in memory 308 and then transferred into system memory 102 or any other storage device.

CPU 101 sets up ETD lists and enables the ETD. Communication between CPU 101 and Host Controller 301 takes place through an address bus, data bus, Start register and data port register. To start a new ETD 301, CPU 101 writes the starting physical address in the StartAddress register 818 (FIG. 8L) and then the ETD is written into the DataPort register 851 (FIG. 9C) and then transferred to ETD memory 308A. The size of the data packet that is sent to an endpoint is typically less than the smaller of "maximumPacketSize" and specified by the ETD.

In one aspect of the present invention, a ED may be a 4-byte structure. An example of a ED format is given in FIG. 4A and the plural fields are defined in FIG. 4B. It is noteworthy that the ED 404 of FIG. 4A includes a field that signifies the type of transfer, namely, interrupt, control, bulk or isochronous.

Figure 4C:
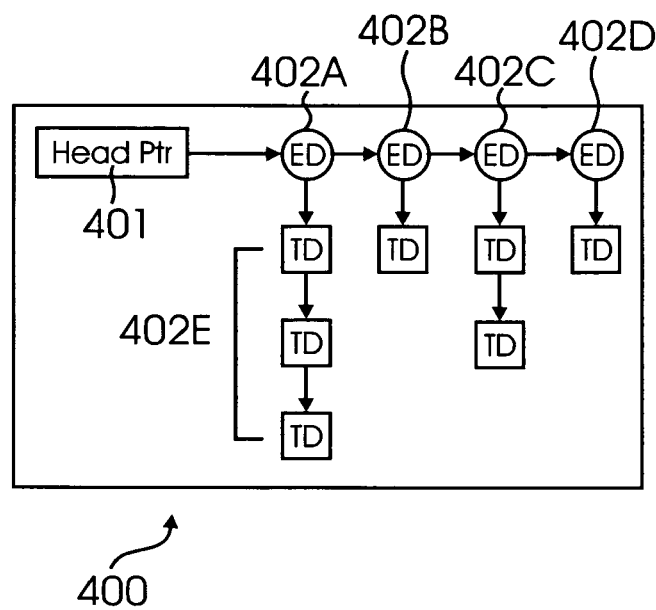
FIG. 4C shows a data structure, according to one aspect of the present invention.

A TD is a local memory 308 structure used by Host Controller 301 to define data that is moved to and/or from an endpoint. Transfer Descriptors are linked to a ED for a specific endpoint. A TD contains data toggle information, local memory 308 location and completion codes. Each TD describes one or more packets. FIG. 4C shows a list structure of EDs and TDs as a part of the ETD structure 400.

TDs may be designated for Isochronous, Interrupt or Control/bulk data transfer.

An isochronous TD handles isochronous transfers i.e. transaction is associated with a defined frame number, one packet per frame, and each packet may have a different length. An Interrupt TD is used at a pre-defined time interval, at a given relative polling position within that interval and if not acknowledged (NAKed), retried at the next interval.

A Bulk/Control TD uses a similar format. FIG. 4E shows an example of a Control/Bulk TD format. FIG. 4F shows an example of an Interrupt TD format.

FIG. 4G describes the various fields shown in FIGS. 4E and 4F for Bulk, Control and Interrupt TD.

Sequence Bits

The USB protocol uses data PID sequencing to ensure that data packets are received in the correct order. The sequencing requires that a data transmitter continue to send the same data packet with the same data PID (e.g., DATA0 or DATA1) until it has determined that the data packet has been successfully received and accepted. Reception and acceptance are indicated when the transmitter receives an ACK packet after sending a data packet. In order to ensure that data packets are not lost, Host Controller 301 and the endpoint have "data toggle synchronization".

Data toggle synchronization is established at endpoint initialization with the nominal value for the first packet to/from an endpoint using DATA0 value. On each successive successful packet transmission/reception, the data toggle value changes.

Data toggle value is maintained within a Control/Bulk and Interrupt TD by alternating the least significant bit ("LSb") of the "dataToggle" field. When the data toggle value must be carried between two TDs, the "toggleCarry" bit in the ED is used to propagate the correct value to the next TD.

When the most significant bit ("MSb") of the dataToggle field is a certain value, e.g., 0, the value of the data toggle is obtained from the toggleCarry bit in the ED and the LSb of the dataToggle field is ignored. When the MSb of the dataToggle field is a certain value, e.g., 1, then the LSb of the dataToggle field contains the value that is used for the data toggle.

For bulk and interrupt endpoints, most TDs are queued with a certain dataToggle value, e.g., 00b. This allows data toggle to be carried across multiple TDs with the ED containing the value to be used for the first data packet in each transfer. After the first data packet is successfully transferred, the MSb of dataToggle value is set to indicate that. For the remainder of the transfer, the dataToggle field determines the data toggle value and the LSb is set to indicate the next toggle value. When the TD is retired, the toggleCarry bit in the ED is updated to indicate the data toggle value that will be used on the next packet for the endpoint.

For control endpoints, USB specification requires that a "Setup packet" use a data PID of DATA0, the first data packet uses a data PID of DATA1, and the Status packet uses a data PID of DATA1. Since this sequence does not rely on any previous data toggle history, the Setup, data, and status packets are queued with a certain MSb of the dataToggle field value, e.g., 1, and the LSb of each TD is set appropriately (e.g., Setup=0; Status=1; and first data, if any,=1). Although Host Controller 301 updates the toggleCarry bit in the ED whenever a TD is retired, the TD determines the data toggle value.

The data toggle field of a TD is advanced after every successful data packet transaction with the endpoint, including the last. As long as an ACK packet is sent (IN) or received (OUT or Setup), the data toggle will advance, even if other error conditions are encountered. It is noteworthy that the invention is not limited to the foregoing "data toggle" values, other values may be used to implement the various adaptive features of the invention.

Transfer Completion

To access data, CPU 101 first writes the starting address of local memory 308 into the StartAddress register 818, and then data is transferred via data port register 851 to system memory 102.

"CompletionCode" (FIG. 4N) field of a Control/Bulk and Interrupt TD is updated after every attempted transaction, whether successful or not. If the transaction is successful, then the CompletionCode field is set to "NOERROR", otherwise, it is set according to the error type.

A data transfer is also complete when a data packet from an endpoint does not have a size less than the Maximum Packet Size bytes in length. In this case, "LastPacketSize" field is updated to reflect the number of bytes effectively received. Then, if the "bufferRounding" bit in the TD is set, then this condition is treated as normal completion and Host Controller 301 sets the CompletionCode field to "NoError" and puts the TD in a "Done Queue". If the bufferRounding bit in the TD is not set, then this condition is treated as an error and the Host Controller 301 sets the CompletionCode field to DataUnderrun and the Halted bit of the ED is set as the TD is retired.

Transfer Errors for Control/Bulk/Interrupt TDs

Transfer errors occur during packet transmission over USB wires (bus 111), and include "CRC errors", "BitStuffing errors", "DeviceNotResponding" errors. Sequence errors occur when the number of data bytes received do not match the number of bytes expected from an endpoint. System errors occur when Host Controller 301 has a problem resulting with its environment that cannot otherwise be attributed to USB. The following describes how the three types of errors are handled, according to one aspect of the present invention:

Transmission Errors

For errors in this category, USB requires that a transaction be terminated after the transfer fails three times. Host Controller 301 supports this requirement with the ErrorCount field. Host Controller Driver 202 initializes this field to a certain value, e.g., 0, when a TD is queued. This field is updated after each transaction attempt. If there is no transmission error, the field is written to 0. If, however, there is a transmission error, the field is incremented. If the ErrorCount field reaches a certain value, e.g., 2 (10b), and another transmission error occurs (the third error in a row), the TD is removed to the "Done Queue" and the endpoint is halted.

Data toggle mismatches on input data are counted as transmission errors. The cause of a data toggle mismatch is either failure of the endpoint to receive an ACK packet or a device problem. Data received when the data toggle mismatches is discarded and never written to local memory 308.

An error in the PID check field is counted as a transmission error and is reported with a CompletionCode of PIDCheckFailure.

Sequence Errors

Sequence errors occur when data is transferred from an endpoint to Host Controller 301. There are two types of sequence errors: data overrun and data underrun. When either of these error conditions are encountered, the CompletionCode field is set accordingly, the TD is removed, and the endpoint is halted.

A data overrun error occurs when the number of bytes received from an endpoint exceeds "Maximum Packet Size". In the case of an overrun condition, Host Controller 301 writes to local memory 308 all the data received up to the point where the data overrun condition occurred and the TD is removed with overrun error.

System Error

Host Controller 301 receives data from an endpoint (device 203) if there is sufficient buffer space within memory 308 to accept a data packet of Maximum Packet Size from the endpoint. Similarly, Host Controller 301 does not issue an "OUT" or "SETUP" token unless data is downloaded to memory 308 and a whole packet of data that is sent to the endpoint in the data phase.

Special Handling

Not Acknowledged ("NAK"):

During normal working mode, the "StopOnNak" bit is set to a certain value, e.g., 0. When an endpoint returns a NAK packet, all TD fields remain the same after the transaction, as they were when the transaction began. Host Controller 301 makes no changes. The StopOnNak bit is set to a certain value, e.g., 1, when an endpoint returns a NAK packet, and the ETD is removed from the ETD list.

Stall:

If an endpoint returns a STALL PID, Host Controller 301 removes the TD with the CompletionCode set to Stall and halts the endpoint. The ErrorCount, and dataToggle fields retain the values that they had at the start of the transaction.

Isochronous TD

An Isochronous TD is used exclusively for isochronous endpoints. FIG. 4H shows an example of an isochronous TD, according to one aspect of the present invention, while the various fields of FIG. 4H are described in FIG. 4I.

An Isochronous TD describes data packets that are sent to or received from an isochronous endpoint. The data packets in an Isochronous TD have a time component associated with them such that a data packet is transferred only in the specific frame to which it has been assigned. An Isochronous TD may contain buffers for consecutive frames of data (FrameCount+1) with the first (0th) data packet of an Isochronous TD sent in the frame for which the low bits (e.g. 16 bits) of HcFmNumber match the StartingFrame field of the Isochronous TD.

Host Controller 301 does an unsigned subtraction of StartingFrame from the 16 bits of HcFmNumber to arrive at a signed value for a relative frame number (frame R). If the relative frame number is negative, then the current frame is earlier than the 0th frame of the Isochronous TD and Host Controller 301 advances to the next ED. If the relative frame number is greater than FrameCount, then the Isochronous TD expires and an error condition exists.

If the relative frame number is between 0 and FrameCount, then Host Controller 301 issues a token to the endpoint and attempts a data transfer using the buffer described by the Isochronous TD. When the last data packet of an Isochronous TD is transferred, the Isochronous TD is removed to the DoneQueue.

Buffer Addressing:

Local buffer 308 address for an isochronous data packet is determined by using the BufferStartAddress field and LengthN field of the buffers. For physical buffer 0, its start address is BufferStartAddress and its size (packet size) is Length0. For physical buffer 1, its start address is BufferStartAddress+Length0 and its size is Length1 etc. FIG. 4J shows an example of calculating the buffer length for an isochronous TD.

Data Packet Size:

Each data packet has a size indicated by the Length field. For example, if Length=0, then a zero-length packet is indicated. For a zero-length "OUT packet", Host Controller 301 issues a token and sends a zero length data packet. For a zero-length "IN" packet, Host Controller 301 issues a token and accepts a zero-length data packet from the endpoint.

Status:

After each data packet transfer, the corresponding Length is replaced with a value that indicates the status of the data packet transaction. For example, the upper 4 bits of the value may be the "CompletionCode" for the transaction. For an incoming data packet from a USB device (203), the lower bits (e.g. 12 bits) indicates the actual number of bytes written to local memory 308. In the absence of errors, this is also the number of bytes received from the endpoint. For outgoing data packet(s), in the absence of transaction errors, the size field may be set to 0. Together, these two fields (Completion-Code and Size) constitute the Packet Status Word (PacketStatusWord).

Transfer Completion:

An Isochronous TD is completed when all "FrameCount+1" data packets have been transferred. This counting is done with the help of an internal counter. In the frame when R=FrameCount, after the data transaction is complete and the LengthR is updated, the "CompletionCode" of the Isochronous TD is set to NoError and the Isochronous TD is removed to the Done Queue Transfer Errors for Isochronous Endpoints:

Transfer errors for isochronous endpoints fall into four categories, namely, transmission, sequence, time and system.

Transmission Errors:

Since there is no handshake (acknowledgement) for isochronous transfers, Host Controller 301 can detect transmission errors for data transfers from an endpoint to host 100A. The error may be a CRC, a BitStuffing, or a DeviceNotResponding error. If any of these errors occur during the transfer, the CompletionCode of PacketStatusWord[R] is set accordingly and the size field reflects the number of bytes received (up to the size of the buffer defined for the frame) and placed in the local memory buffer 308. For a bit stuffing error, Host Controller 301 writes up to the last byte received before the "BitStuffing error" is detected.

If a transmission error is detected along with a sequence or system error, the transmission error is the one that is reported in the CompletionCode. A PID check error in the PID from an endpoint is reported with a CompletionCode of PIDCheckFailure Sequence Errors:

A sequence error occurs when an endpoint sends more or less data than is expected and a transmission error is not present. If the endpoint sends more data than will fit in a specified buffer, the CompletionCode for the PacketStatusWord is set to "DataOverrun" and the size field is set to the size of the buffer. Host Controller 301 writes received data to local memory 308 up to the limit of the buffer defined for the frame. If the endpoint sends less data than defined by the buffer, the CompletionCode for the PacketStatusWord is set to "DataUnderrun".

Time Errors:

Each data packet has a specific frame in which it is transferred. If Host Controller 301 cannot start or complete the transfer within the specified frames two types of error occur: "skipped packets" and "late retirement" of an Isochronous TD.

Skipped packet error occurs if Host Controller 301 does not process an Isochronous TD in a frame for which the Isochronous TD has data. A skipped packet is indicated when a Length/PacketStatusWord is set to "Not Accessed" after the Isochronous TD is removed. This indicates that Host Controller 301 did not process the Isochronous TD for the frame and therefore did not change the Length to a PacketStatusWord.

If the last packet of an Isochronous TD was not processed in the frame in which it should have been processed and in which the TD should have been retired, the Isochronous TD remains in Host Controller 301. In such cases, Host Controller 301 sets the CompletionCode for the Isochronous TD to "DataOverrun" and removes the Isochronous TD (it does not, however, set the Halted bit in the ED). Host Controller 301 then accesses the next Isochronous TD for the same ED and processes it.

Setting DataOverrun in the CompletionCode for the Isochronous TD rather than the PacketStatusWord indicates a time overrun. The same code in a PacketStatusWord indicates a true data buffer overrun.

System Errors:

System errors occur for isochronous transfers if there is underrun or overflow/overrun of local data memory buffers 308. An Isochronous endpoint may have a certain MaxPacketSize, e.g., up to 1023 bytes. The intra-packet overflow will not occur because each endpoint is at least single buffered in local memory 308. When an underrun error occurs, Host Controller 301 sets the CompletionCode of data packet's PacketStatusWord to BufferUnderrun and the size field is set to zero. This underrun condition is signaled on USB wires by Host Controller 301 forcing a "bit-stuffing" violation with the recommendation that the bit stuff violation last a certain time, e.g., 16 bit times without a transition.

When an overrun condition occurs, Host Controller 301 sets the CompletionCode of the data packet's PacketStatusWord to BufferOverrun and writes the size field to indicate the last byte successfully received from the endpoint before the overrun condition occurred. All data received from the endpoint before the overrun condition occurred are stored in local memory 308. If, after detecting an overrun condition, Host Controller 301 detects a transmission error, then the transmission error is recorded in the PacketStatusWord instead of the overrun error.

FIG. 4L shows an example of a PacketStatusWord format, according to one aspect of the present invention and FIG. 4M describes the field definitions of FIG. 4L.

FIG. 4N provides a listing of various completion codes, used in the various adaptive features of the present invention. For Control/Bulk and Interrupt TDs, the Completion Codes are used only if the TD is on the Done Queue. For CRC, BitStuffing, and DeviceNotResponding errors, the TD is not moved to the Done Queue unless errors are encountered in three successive attempts (error does not have to be the same in all three attempts.)

For Stall, DataOverrun, or DataUnderrun, the TD is moved to the done queue on the first occurrence of the error. BufferOverrun or BufferUnderrun may not be used for Non-Isochronous TDs.

When a Non-Isochronous TD is moved to the done queue with the CompletionCode set to other than NoError, the Halted bit in the ED for the endpoint is set to halt processing of the TDs.

For an Isochronous TD, Completion Codes appear in two places: in CompletionCode of "Dword0" and in each of the Length/PacketStatusWords. For each data packet processed, Host Controller 301 converts LengthR into "PSWR" by setting the CompletionCode field. All Completion Codes are valid for a PacketStatusWord. The CompletionCode in Dword0 of the Isochronous TD is set when the TD is moved to the done queue. The Isochronous TD can be moved to the done queue when the last data packet is transferred (in which case the CompletionCode will be NoError) or due to the frame for the last data packet having passed (in which case the CompletionCode will be DataOverrun.) Host Controller 301 does not set the Halted bit in the ED for an Isochronous TD. An Isochronous TD with a NoError CompletionCode may contain PacketStatusWords with CompletionCodes other than NoError.

ETD Communications Area

ETD Communications Area 308A is a defined structure of local memory 308 that is used by Host Controller Driver 202 to send and receive specific control and status information to and from Host Controller 301. Host Controller Driver 202 must write this structure in an ETD table, shown in FIG. 4O. Host Controller 301 uses these ETDs to perform the transfer. Host Controller Driver 202 reads values from this structure that was written by Host Controller 301.

In one aspect of the present invention, an ETD table may be composed of certain number of blocks, e.g., 16 blocks of 8 Dwords. Before Host Controller Driver 202 reads/writes an ETD, it first writes appropriate parameters into HcAccessStartAddress register 818, described below, which specifies the memory space (ETD memory 308A), the physical address to start with, and the read/write direction. For each new endpoint, its ED is first written into an ETD holder (not shown). Then its first TD is written below the ED. Each TD defines one or several transactions as described before. When the TD is removed, it is sent to the DoneQueue and a time deferred or immediate interrupt is generated. Host processor 101 reads out the retired TD and writes the next TD of the endpoint to the same position, or writes a new ETD to replace the finished ETD.

In one aspect of the present invention, each ETD takes 8 Dwords space in ETD memory 308A. Each ETD has an associated bit in the HcETDEnableStatus register 829, indicating if the ETD is enabled. The HcETDEnable status register has certain number of bits, e.g., 16 bits associated with each ETD. Host Controller 301 knows if an ETD is isochronous by checking the format field of the ED. This is a dynamic table that changes when a new endpoint is added or an existing endpoint is removed from the ETD table 308D.

FIG. 4O shows an ETD table 308D with control signals, according to one aspect of the present invention. The following describes the various ETDs (ETD01-ETD15) in FIG. 4O.

ETD 1 is a non-isochronous ETD. It is enabled, and not on the Done Queue, meaning that it is active and must be served.

ETD 2 is another isochronous ETD. It is enabled, and is not on the Done Queue.

ETD 3 is a non-isochronous ETD. It is enabled, and not on the Done Queue.

ETD 4 is a non-isochronous ETD. It is enabled, but it is on the Done Queue, meaning that it has retired. It works in DMA mode.

ETD 5 is a non-isochronous ETD. It is not enabled, meaning the Host Controller 301 ignores it.

ETD 6 to 13, are invalid, because the enable bit is 0.

ETD 14 is non-isochronous. It is enabled, active and operates in non-DMA mode.

ETD 15 is another isochronous ETD. It is enabled, and is not on the Done Queue.thus active and operates in DMA mode.

An ETD is enabled or disabled through the HcETDSetEnable register 829 or HcETDClearEnable register 827.

ETD DoneQueue

Register 835, as shown in FIG. 8U indicates if a TD is retired (with or without an error). A bit is asserted at the same time as the CompletionCode update in the completed TD. From time to time, the deferred interrupt count is zero and an interrupt is generated. Host software 201 can check the retired TDs by reading HcDoneQueue register 835. It can then decide to read out all the retired TDs and process them.

ETD Mode:

When an ETD is set up in ETD table 308D, its default working mode may be set as the "PIO" mode, or in DMA mode where DMA controller 113 may be used to automate data transfer between system memory 102 and local memory 308.

Each ETD may be individually programmed for DMA or PIO mode. When an ETD is removed, the associated DMA channel is also dissolved. When the ETD is put on the DoneQueue, the corresponding working mode bit is also cleared. This means that the DMA channel association exists at the ETD (transfer) level. The freed DMA channel can be used for the next ETD of the same endpoint, or for another ETD. Hence, in one aspect of the present invention, DMA channels are efficiently used to transfer data.

Host Controller 301 Operation in USB States

Host Controller 301 can operate in four USB states, namely, UsbOperational, UsbReset, UsbSuspend, and UsbResume. These states define Host Controller 301 responsibilities relating to USB signaling and bus states.

Figure 5A:
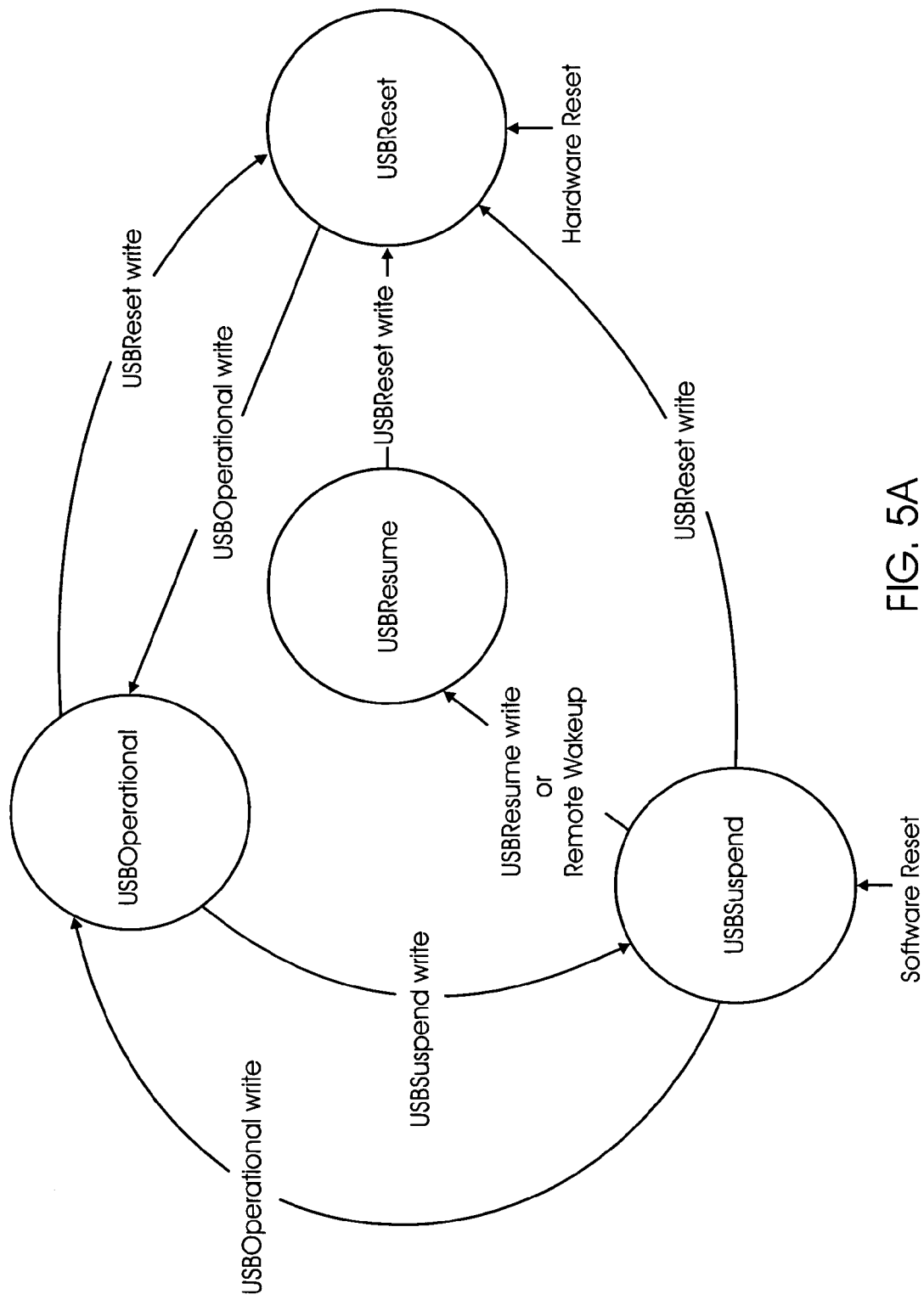
FIG. 5A shows various USB states of a USB Host Controller, according to one aspect of the present invention.

USB states are reflected in HostControllerFunctionalState field of the HcControl registers 802 (FIG. 8C). Host Controller Driver 202 performs the USB state transitions shown in FIG. 5A.

USB Operational State:

When in the UsbOperational state, Host Controller 301 may process lists and generate Start of Frame ("SOF") tokens. The UsbOperational state may be entered from the UsbResume or UsbReset states. It may be exited to the UsbReset or UsbSuspend states.

When transitioning from UsbReset or UsbResume to UsbOperational, Host Controller 301 terminates the USB reset or resume signaling as defined in the USB Specification prior to sending a token.

A transition to the UsbOperational state affects the frame management registers of Host Controller 301. Simultaneously with Host Controller 301's state transition to UsbOperational, the FrameRemaining field of HcEmRemaining register 839 is loaded with the value of the FrameInterval field in HcEmInterval register 335. There is no SOF Token sent at this initial load of the FrameRemaining field. The first SOF Token sent after entering the UsbOperational state is sent following the next frame boundary when FrameRemaining transitions from 0 to FrameInterval. The FrameNumber field of HcFmNumber register 841 is incremented on a transition to UsbOperational state.

USB Reset:

When in the UsbReset state, Host Controller 301 forces reset signaling on bus 202. Host Controller 301 list processing and SOF Token generation are disabled while in the UsbReset STATE. In addition, the FrameNumber field of HcFmNumber register 841 does not increment while Host Controller 301 is in the UsbReset state. UsbReset state can be entered from any state at any time. Host Controller 301 defaults to the UsbReset state following a hardware reset. Host Controller Driver 202 is responsible for satisfying USB Reset signaling timing defined by the USB Specification.

USBSUSPEND:

In UsbSuspend state, Host Controller 301's list processing and SOF Token generation are disabled. However, the Host Controller 301's remote wakeup logic monitors USB wakeup activity. The FrameNumber field of HcFmNumber does not increment while Host Controller 301 is in the UsbSuspend state. UsbSuspend state is entered following a reset or from the UsbOperational state, on command from Host Controller Driver 202.

While in UsbSuspend, Host Controller 301 may force a transition to the UsbResume State due to a remote wakeup condition. This transition may conflict with Host Controller Driver 202 initiating a transition to the UsbReset State. If this situation occurs, Host Controlled Driver 202 initiated transition to UsbReset has priority. Host Controller Driver 202 must wait a certain time period after transitioning to UsbSuspend and before transitioning to the UsbResume State. Likewise, Root Hub 104 must wait after Host Controller 301 enters UsbSuspend before generating a local wakeup event and forcing a transition to UsbResume. Following a software reset, Host Controller Driver 202 may cause a transition to UsbOperational if the transition occurs not more than 1 ms from the transition into UsbSuspend. If the 1-ms period is violated, it is possible that the device(s) (203) on the USB bus 111 may go into Suspend.

USB Resume:

When in the UsbResume state, Host Controller 301 forces resume signaling on bus 111. While in UsbResume state, Root Hub 104 propagates the USB Resume signal to downstream ports as specified in the USB Specification. Host Controller 301's list processing and SOF Token generation are disabled while in UsbResume state. In addition, the FrameNumber field of HcFmNumber register 841 does not increment while Host Controller 301 is in the UsbResume state.

UsbResume is entered from UsbSuspend. The transition to UsbResume can be initiated by Host Controller Driver 202 or by a USB remote wakeup signal from Root Hub 104. Host Controller 301 is responsible for resolving state transition conflicts between the hardware wakeup and Host Controller Driver initiated state transitions. Host Controller Driver 202 is responsible for USB Resume signal timing as defined by the USB Specification.

HCSuspend:

HCSuspend state is entered upon command from the Host Controller Driver 202. The clock system of the Host Controller 301 is turned off. Only the single-ended receivers of downstream port(s) of the Root-Hub 104 remain on, to monitor the remote wakeup signaling from a device. When Host Controller 301 asynchronously detects a remote wakeup signaling, it generates a request to the clock circuitry of the Host Controller 301 so that the clock signal is turned on.

Frame Management:

Host Controller 301 is responsible for managing all aspects of "framing" for the USB. These responsibilities include the sending of SOF Tokens on bus 111 and communicating with Host Controller Driver 202 on frame-specific information.

Frame Timing:

Host Controller 301 uses registers to perform the frame timing and information reporting tasks of frame management. Host Controller 301 as a reference number for the current frame keeps the FrameNumber field, which may be 16 bits (FIG. 4D), of the HcFmNumber register 841. This frame number is sent over USB bus 111 as the Frame Number field in SOF Tokens and is reported by Host Controller 301 for use by Host Controller Driver 202. The FrameInterval field of HcFmInterval register 837 and the FrameRemaining field of HcEmRemaining register 839 are used to define frame boundaries.

The FrameInterval field stores the length of a USB frame in bit times, e.g., 12-MHz bit times. Specifically, the FrameInterval field corresponds to (Frame Length–1) bit times. FrameInterval is loaded with a default value, e.g., a value of 0x2EDF (11,999 decimal) at reset. This value produces a USB frame consisting of certain bit times, e.g., 12,000 bit times. Host Controller Driver 202 may vary the value of FrameInterval at any time.

Figure 4D:
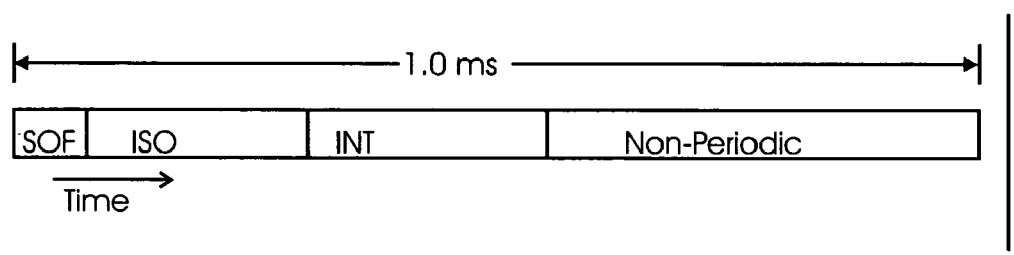
FIG. 4D shows bandwidth allocation according to one aspect of the present invention.

An example of frame format is provided in FIG. 4D. Each frame begins with a SOF and is sent by Host Controller 301 to bus 111. This is followed by Host controller 301 servicing isochronous ETDs and interrupt ETDs. After the periodic transfers are complete, any remaining time in the frame is consumed by servicing non-periodic transfers.

The FrameRemaining field functions as a counter, e.g., as a 14-bit frame counter. When operating, the register value decrements once per USB bit time. When FrameRemaining reaches a certain value, e.g., 0, it is loaded with the value of the FrameInterval field at the next bit-time boundary. The frame boundary is the bit boundary on which the value of FrameRemaining transitions from 0 to FrameInterval (a J to K transition is seen on the USB at this boundary signifying the first bit of the sync field of an SOF Token). In other words, the last bit time for a frame is defined as the bit time in which the value of FrameRemaining is 0. The first bit time for a frame is defined as the bit time in which the value of FrameRemaining is equal to FrameInterval.

HcFmNumber register 841 holds the current frame number in the FrameNumber field. This field is incremented by Host Controller 301 at each frame boundary. FrameNumber is incremented when the FrameRemaining field transitions from 0 to FrameInterval. Host Controller Driver 202 in the construction of a larger resolution frame number may use the FrameNumber field. Host Controller Driver 202 has access to the FrameNumber field to HcFrameNumber at any time. Immediately following the increment of the FrameNumber, the Host Controller 301 sets the StartOfFrame bit in the HcInterruptStatus register 806 to signify a StartOfFrame interrupt event.

SOF Token Generation:

When in the UsbOperational state Host Controller 301 generates an SOF Token at the beginning of each frame period. There are no SOF Tokens generated when the Host Controller 301 is in a state other than UsbOperational.

Figure 5B:
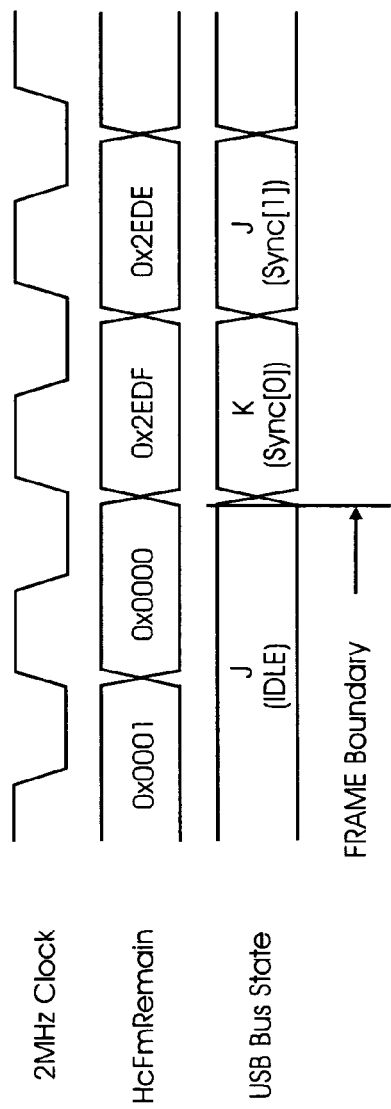
FIG. 5B shows a start of frame timing chart, according to one aspect of the present invention.

Host Controller 301 must be exact in its delivery of the SOF token to the USB. Host Controller 301 sends the first bit of the SOF Token "SYNC" field during the first bit time of the frame. The timing chart of SOF Token on bus 111 is shown in FIG. 5B.

ETD Table Processing

Priority

In one aspect of the present invention, Host Controller 301 processes endpoints whose ETDs are written to ETD table 308D in ETD memory 308A. Among the four types of ETDs (Control, Bulk, Isochronous, and Interrupt), the Isochronous ETDs are processed first, Interrupt ETDs second, and then the Control and Bulk ETDs are processed. Control Endpoints are given equal or more preference over Bulk Endpoints for processing. More specifically, N Control Endpoints are given access to the bus 101A for every 1 Bulk Endpoint.

Figure 5C:
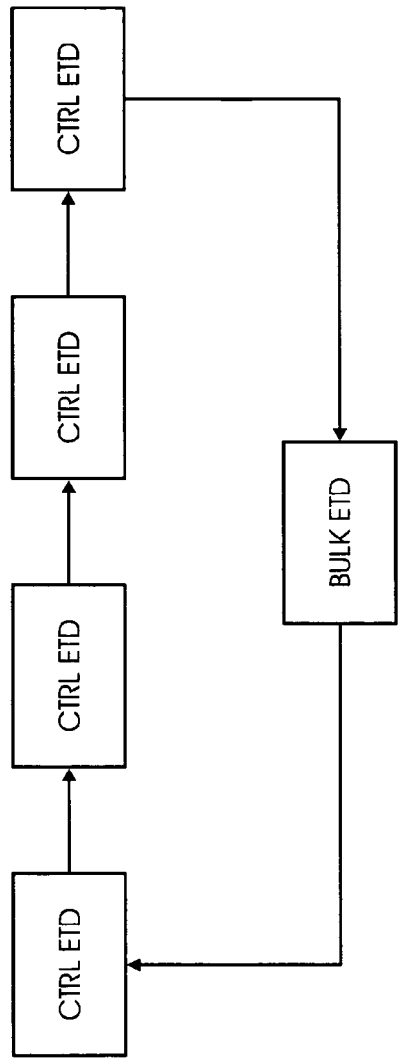
FIG. 5C is a block diagram showing control bulk service ratio, according to one aspect of the present invention.

Host Controller Driver 202 can program the Control Bulk Service Ratio via the ControlBulkServiceRatio field of the HcControl Register 802. Control Bulk Service Ratios may be from 1:1 to 4:1. An example of a 4:1 Control/Bulk Service Ratio is shown in FIG. 5C.

Within a given type, the ETD whose index is lowest is processed first. Host Controller Driver 202 allocates a certain percentage of processing time for Isochronous, Interrupt, Bulk and Control ETDs.

When Host Controller 301 reaches the last ETD for Control or Bulk, it starts again with the first ETD of Control or Bulk endpoint. Servicing an ED is defined as making a single transaction attempt based on the TD. Once a transaction attempt is made, whether successful or not, and the appropriate actions are taken to complete that transaction, Host Controller 301 services the next endpoint rather than make a second transaction attempt on the current endpoint.

In system memory 102, the priority TDs are on a queue under an ED for an endpoint. Only one of them is written into ETD table 308D in ETD memory 308A for one endpoint. When one TD is retired, it is first read out and the next TD is written into ETD table 308D for processing.

Figure 5D:
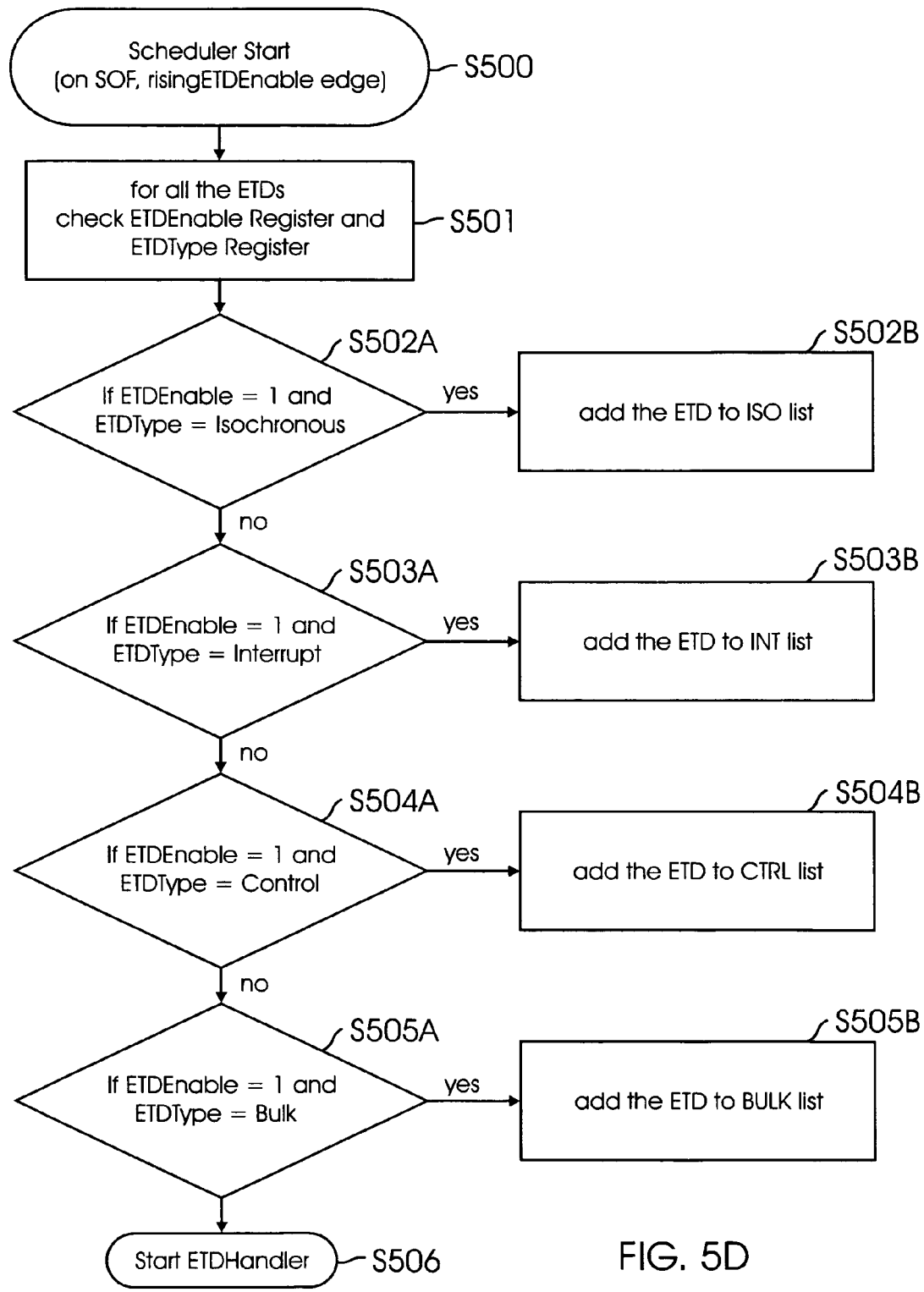
FIG. 5D is a flow diagram showing executable process steps for setting up ETD priorities, according to one aspect of the present invention.

In one aspect, the foregoing system is scalable to local memory 308 size. CPU 101 writes the start address of an ETD in a register, as discussed below and data is written into local memory 308, which is accessible on word basis and/or word burst basis. Hence, the address bus (FIG. 3) size does not require any changes ETD Service Flow:

FIG. 5D shows executable process steps for processing ETDs according to one aspect of the present invention.

In step S500, Scheduler 301C starts. Typically this starts for each SOF and the rising edge of the ETDenable register 825 bit.

In step S501, Host Controller 301 checks ETD type and ETDenable register 825 values for the all the four types of ETDs.

In step S502A, if the ETDEnable register value is enabled, for example, 1, and the ETD type is isochronous, then in step S502B, the ETD is added to the isochronous list in ETD table 308D in ETD memory 308A.

In step S503A, if the ETDEnable register value is enabled, for example, 1, and if the ETD type is interrupt, then in step S503B, the ETD is added to the interrupt list in the ETD table 308D in ETD memory 308A.

In step S504A, if the ETDEnable register value is enabled, for example, 1, and the ETD type is Control, then in step S503B, the ETD is added to the control list in the ETD table 308D in ETD memory 308A.

In step S505A, if the ETDEnable register value is enabled, for example, 1 and if the ETD type is bulk, then in step S505B, the ETD is added to the interrupt list in the ETD table in ETD memory 308A.

Figure 5E:
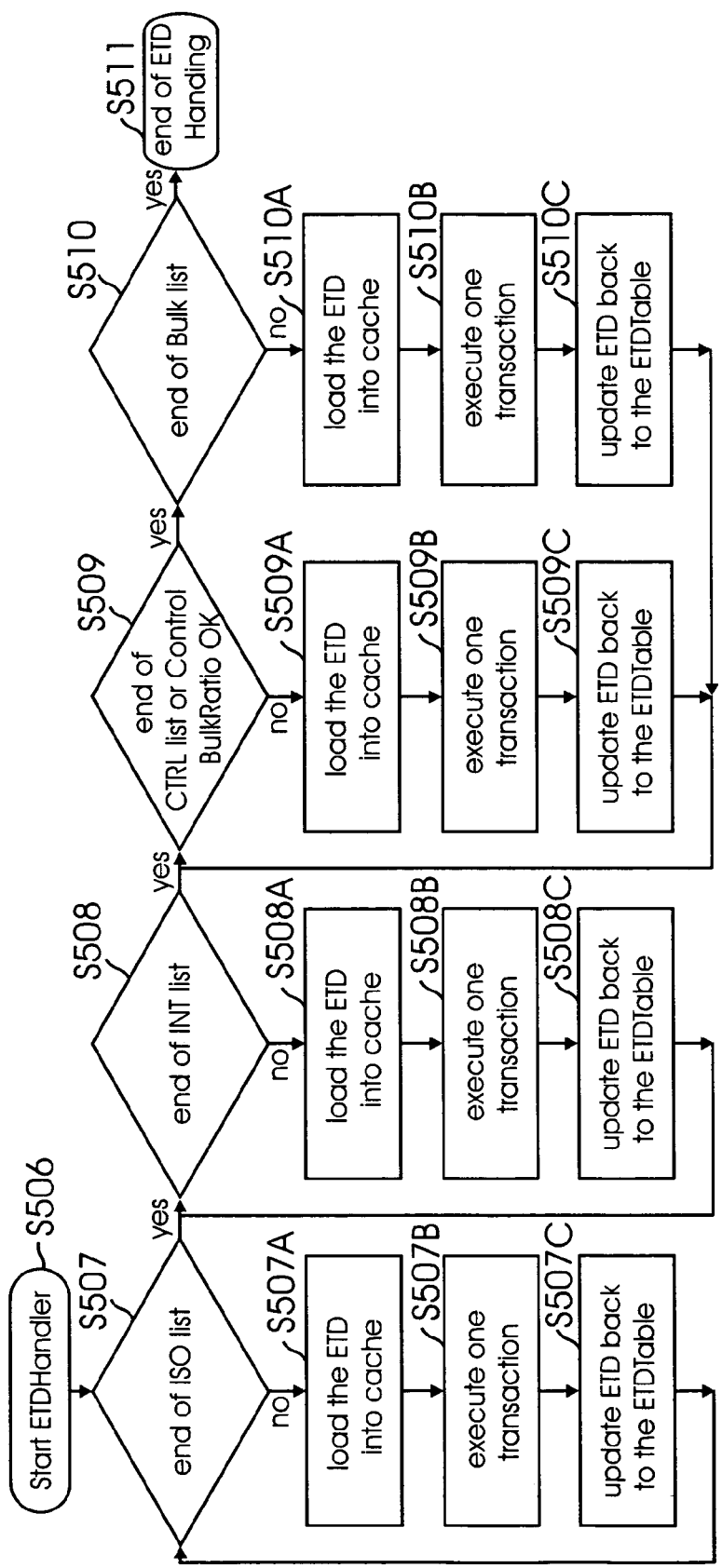
FIG. 5E is a flow diagram showing executable steps for processing ETDs, according to one aspect of the present.

After the ETD table is populated and the lists are updated, in step S506, ETD handler 301B is started to process the ETDs as discussed below with respect to FIG. 5E.

In step S507A, ETD handler 301B determines if there are remaining isochronous ETDs. Then in step 507A, ETD handler 301A loads the ETDs into cache (not shown), executes the ETD in step S507B, and then updates the ETD table 308D in step S507C.

When processing an Isochronous TD, Host Controller 301 calculates the relative frame number. This calculation determines which, if any, packet will be sent during a current frame.

Host Controller 301 updates the Length[R] field after packet transmission using the Packet Status Word. For an "OUT packet", the Size field is set to a certain value, e.g., 0, if there is no error. For an IN packet, the Size field reflects the actual number of bytes written to local memory buffer 308. Regardless of transfer direction, the CompletionCode field is updated to reflect the outcome of transmission.

In step S508, ETD handler 301B determines if there are remaining interrupt ETDs. Then in step 508A, ETD handler 301A loads the ETDs into cache (not shown), executes the ETD in step S508B and then updates the ETD table in step S508C.

When processing an Interrupt TD, the relative polling position may be used to determine if an endpoint should be served in a particular frame. Host Controller Driver 202 programs the initial value of "RPP" when the TD is written from system memory 102. This value then decrements by one for every frame time. When RPP reaches a certain value, e.g., 0, this TD is served, after which RPP is re-loaded with its initial value. Once an ETD is written into ETD table 308D and it is enabled, the first interrupt transaction is attempted and after that an interrupt transaction is attempted every polling interval frame.

In step S509, ETD handler 301B determines if there are remaining bulk ETDs. Then in step 509A, ETD handler 301A loads the ETDs into cache (not shown), executes the ETD in step S509B and then updates the ETD table in step S509C.

In step S510, ETD handler 301B determines that there are remaining control ETDs, then in step 510A, ETD handler 301A loads the ETDs into cache (not shown), executes the ETD in step S510B and then updates the ETD table in step S510C.

Control/Bulk and Interrupt ETDs are updated after every attempted transaction. The CompletionCode field, the DataToggle field, the PacketCount field, and occasionally the ErrorCount field are updated after a transaction attempt.

The DataToggle field is updated to reflect the data toggle value for the next transfer. If the packet transmission is complete, Host Controller 301 sets the MSb and toggles the LSb of DataToggleControl field to reflect a new value for the next packet. If the current packet did not complete with a proper ACK or NAK packet, the field is not be changed.

The PacketCount is updated to reflect the data transferred in the current packet if the transmission ended with a proper ACK. For an IN endpoint, if Host Controller 301 received a packet with an incorrect data toggle, the PacketCount is not updated because the packet is discarded. For an OUT endpoint, if the Host Controller 301 received a NAK packet, the PacketCount may not be updated because Host Controller 301 retries the current packet.

If there is an error in packet transmission, the ErrorCount field is incremented. If the ErrorCount is 2 and another error occurs, the ETD is retired with the error code reflected in the CompletionCode field.

The CompletionCode field of a Control/Bulk and Interrupt Transfer Descriptor is updated after every attempted transaction whether successful or not. If the transaction is successful, the CompletionCode field is set to "No Error", otherwise, it is set according to the error type.

When an endpoint returns a NAK packet for a transmission, all Control/Bulk and Interrupt Transfer Descriptor fields are the same after the transaction as they were before the transaction. Host Controller 301 does not need to make any changes, except the case where StopOnNak is enabled.

In step S511, ETD handling is terminated.

Once Host Controller 301 determines a packet's size, it must check to see if packet transmission can occur over USB before the end of the frame. This is determined by comparing the bit times remaining before the end of the frame with the bit time requirement of the packet to be transmitted. If the bit time requirement of the packet is larger than the bit times remaining in the frame, the transaction may not be initiated. This ensures that Host Controller 301 is not responsible for causing a "babble" condition on the bus. For full speed transactions, Host Controller 301 uses the Largest Data Packet Counter to determine if a given packet can be transferred.

For low speed transactions, regardless of data size, Host Controller 301 compares the current value of the FrameRemaining field of HcEmRemaining register 839 with the value of the LSThreshold field of the HcLSThreshold register 843. If FrameRemaining is less than LSThreshold, the low speed transaction is not started.

At each frame boundary, the Largest Data Packet Counter is loaded with the value of the FSLargestDataPacket field in HcEmInterval register 837 (at the same time FrameRemaining is loaded with the value of FrameInterval).

When Host Controller 301 loads a ETD, the worst case number of bit times for the data transfer is known. This value is the byte count multiplied by a certain number, e.g., 8, using the MaximumPacketSize byte count for reads (the transaction overhead and the frame overhead are accounted for in the initial value of the counter). If the bit count required is greater than the remaining bit count in the Largest Data Packet Counter, the transfer is not started. When the transfer is not started, there is no status writeback to the ETD.

When an ETD is complete (all data sent/received) or an error condition occurs, the ETD is retired. Several actions are required to retire an ETD. Host Controller 301 sets the corresponding bit in the HcDoneQueue register 835. Host Controller 301 updates the ETD to reflect the changes to the DataToggleCarry field, and potentially the Halt field. The retired ETD is effectively dequeued. Host Controller driver 202 can then write into ETD table 308D the next ETD on the TD queue of the endpoint.

Host Controller 301 also updates the DataToggleCarry field of the ETD. The DataToggleCarry field reflects the last data toggle value from the retired ETD. If the ETD is being retired because of an error, Host Controller 301 updates the Halt bit of the ETD.

To complete ETD retirement, Host Controller 301 updates the DoneQueue Interrupt Counter located at host registers 301D, described below. The InterruptDelay field of the ETD specifies the maximum number of SOFs that occurs before Host Controller 301 generates an interrupt. If the value of the InterruptDelay field is a certain value, e.g., 111b, Host Controller Driver 202 does not require an interrupt for the ETD and the DoneQueue Interrupt Counter is left unchanged.

If the value of the InterruptDelay field is not 111b (or some other value), but is greater than or equal to the current value of the DoneQueue Interrupt Counter, the counter is also left unchanged. In this case, another ETD already on the DoneQueue requires an interrupt earlier than the ETD being retired.

If the value of the InterruptDelay field is not 111b, but is less than the current value of the DoneQueue Interrupt Counter, the counter is loaded with the value of the InterruptDelay field. In this case, the ETD being retired requires an interrupt earlier than all of the ETDs currently on the DoneQueue. If the ETD is being retired with an error, then the DoneQueue Interrupt Counter is cleared as if the InterruptDelay field were zero.

Host Controller 301 maintains a counter (e.g., a 3-bit counter) that is used to determine how often the HcDoneQueue register 835 value must be read out by system software 201. The counter is initialized with a value, e.g., 111b, at software reset, hardware reset, and updated when the Host Controller 301 transitions to the USBOPERATIONAL state.

The counter functions when Host Controller 301 is in the USBOPERATIONAL state by decrementing at every frame boundary simultaneous with the incrementing the FrameNumber field in HcFmNumber registered 841 if the current value of the counter is other than 111b or 0. If the current value of the counter is other than a certain value (111b or 0), the counter is effectively disabled and does not decrement.

Host Controller 301 checks the value of the counter during the last bit time of every frame when in the USBOPERATIONAL state. If the value of the counter is 0 at that time, and the DoneQueue is not empty, then an interrupt is generated.

Figure 6A:
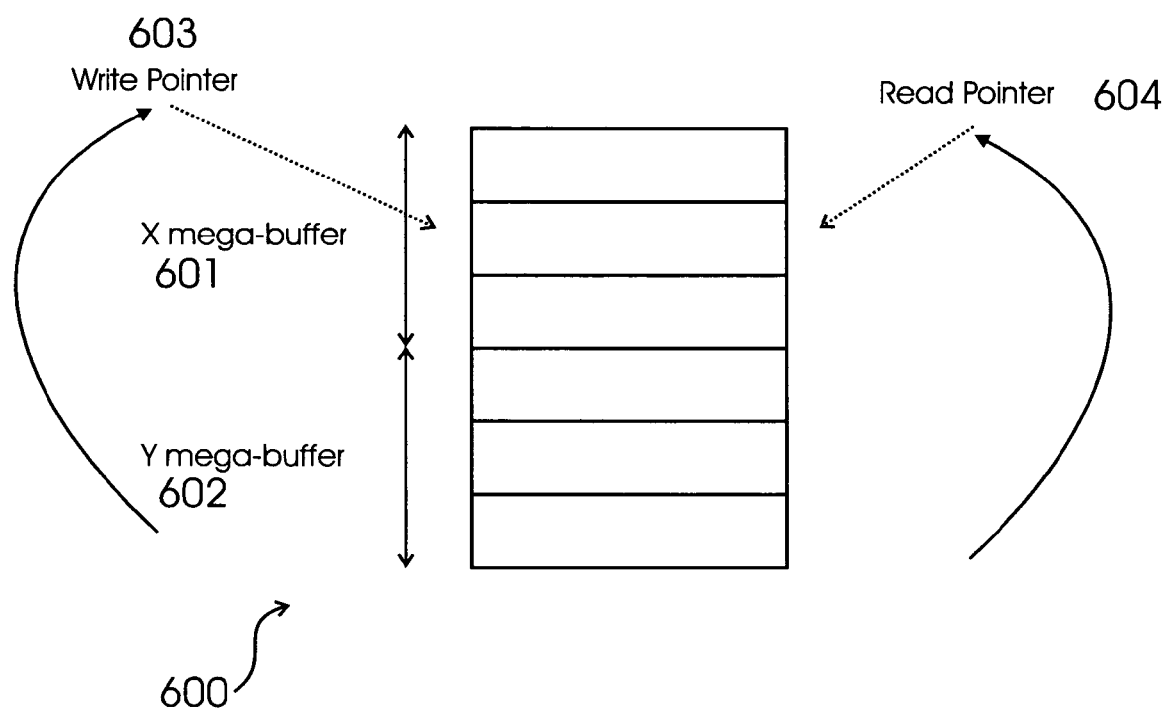
FIG. 6A is a diagram of a mega-buffer, according to one aspect of the present invention.

Mega Buffering:

FIG. 6A shows an example of how a memory buffer in local memory 308 may be used to transfer data between host system 101A and a USB device. In one aspect the present invention uses a write pointer, a read pointer and plural filled flags (Xbufferfilled and Ybufferfilled, described below) to read and write data. The write side sets the XBufferfilled or Ybufferfilled flag when a memory buffer is full and the read side clears the flag when data is read out.

Buffer 600 is divided into two parts, X buffer 601 and Y buffer 602. Write pointer 603 and read pointer 604 are used to read and write data, as described below. X-buffer 601 and Y-buffer 602 may not be contiguous.

Size of the buffers is based on the type and size of TDs. Packet count filed (PC) defines the number of packets in a TD. For example, for isochronous TD, CPU 101 needs to set up and enable a TD before the actual frame number reaches the Starting Frame. For all types of endpoints, different packet sizes are used and that is one of the factors in varying the buffer size. Hence each mega-buffer (e.g. X-buffer 601 and Y-buffer 602) can be programmed by CPU 101 to hold NP (number of packets per buffer) packets.

Host Controller Driver 202 can schedule a certain number of packets for each TDs indicated by Packetcount. However, CPU 101 may allocate a smaller size for a particular endpoint. Each ETD is allocated a double mega-buffer (FIG. 6A) which can hold NP packets of data. CPU 101 sets up an ETD and enables it. Communication between CPU 101 and Host Controller 301 is through address bus, data bus, StartAddress register 818 and Dataport register 851. ETD memory 308A and data memory 308C use separate addresses.

To write an ETD into Host Controller 301 memory 308, CPU 101 writes the starting physical address of the ETD into StartAddress register 818 and the writes the ETD word by word to the DataPort register 851. Internal logic keeps an address count of ETD memory, transfers ETD elements from DataPort register 851 to ETD memory 308A. ETD and data phase are indicated by a "T" bit of StartAccess register 818 (FIG. 8L). CPU 101 has access to every element of an ETD by the memory address of StartAddress register 818. Burst access is obtained by specifying the start address of the burst through StartAddress register 818 and then through DataPort register 851.

Figure 6B:
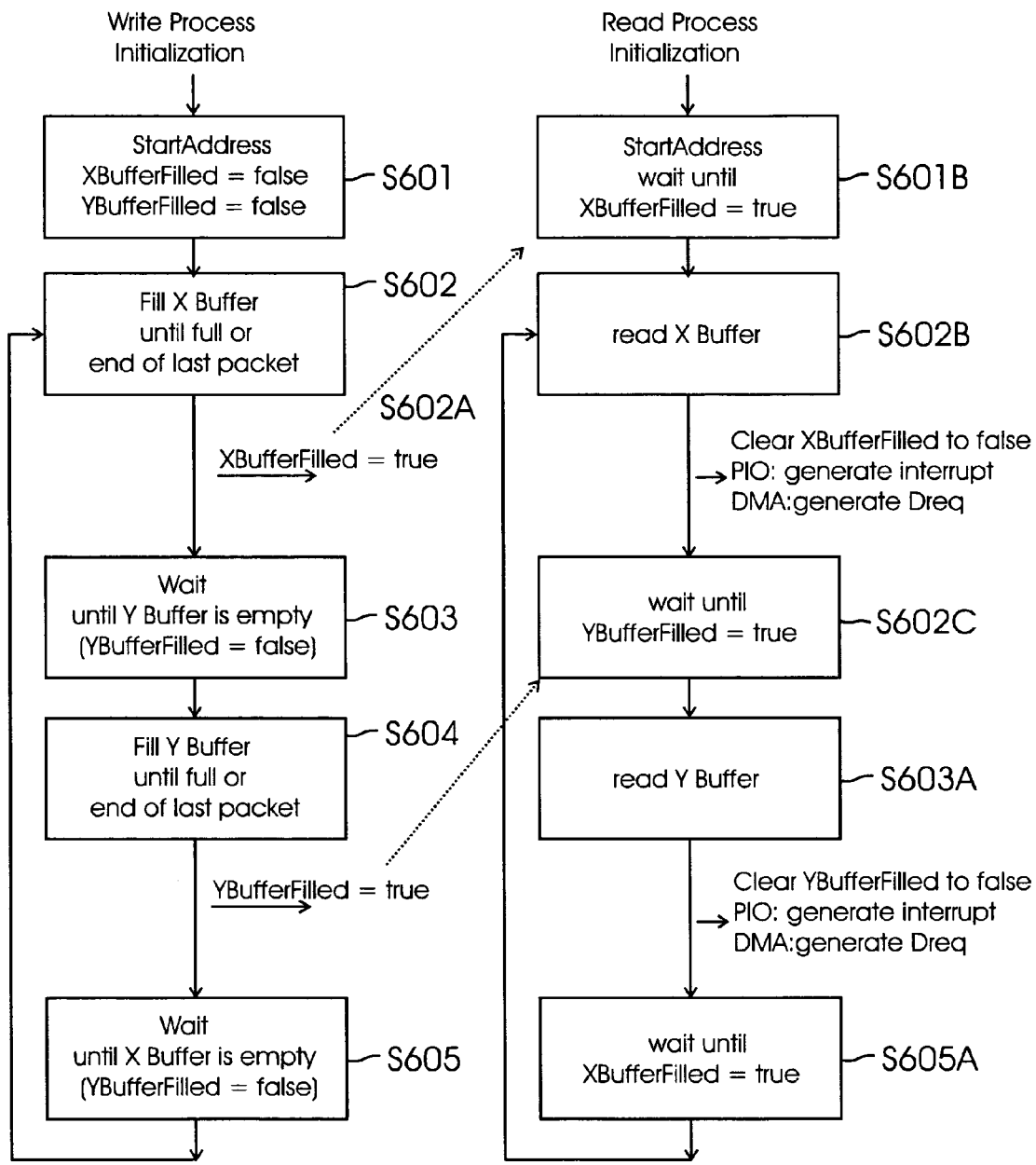
FIG. 6B is a flow diagram of executable steps showing the use of mega-buffers when data is sent out to an endpoint, according to one aspect of the present invention.

FIG. 6B shows a process flow diagram of executable process steps for using local memory 308, according to one aspect of the present invention. In one aspect, the process prevents under utilization of memory 308 because Host Controller 301 is not allowed to send data until one segment of data buffer (e.g., X-buffer 601, as shown in FIG. 6A) is full. Data from system memory 102 is first transferred to X-buffer 601. When X-buffer 601 is full, Host Controller 301 may transfer data from X-buffer 601.

X-buffer 601 may hold up to NP packets. Host Controller 301 segments data into individual packets for reading.

When X-buffer 601 is being read, another buffer, Y-buffer 602 is filled. X-buffer 601 and Y-buffer 602 are used circularly, for example, when Y-buffer 602 is filled and less than PacketCount packets have been written from system memory 102, then incoming packets are routed to X-buffer 601, if it is available. The process continues until all data is written in local memory 308.

Turning now in detail to FIG. 6B, in step S601, CPU 101 first writes the starting physical address into Start Address Register 818 located at 301D.

In step S602, based upon the ETD, data is written from system memory 102 to local memory 308. Data is first written to X buffer 601. When buffer X-buffer 601 is full, it is indicated by the Xbuffer Filled register 820. Once X-buffer 601 is filled, it may be read in step S602A. While data is read from X-buffer 601 in step S602A, in step S603, data is written to Y-buffer 602. X-buffer 601 and Y-buffer 602 are used in a circular fashion, as discussed above.

In step S604, Y-buffer 602 is filled and then read in step S604A. This process continues, namely, X-Buffer 601 is filled in step S605 and the process waits until X-buffer is read in step S605A.

Various interrupts are generated during this process, e.g., in step S602C and S604B and are described below.

A handshake (or acknowledgement) is used during the data transfer between system memory 102 and local buffers 308. This handshake takes different forms depending on how data transfer is done, i.e. through DMA controller 113 or through a PIO.

In the DMA mode, the microprocessor 101 sets up and enables an ETD. ETD scheduler 301C detects this new ETD and finds out that there is data available for sending out to the USB bus 111, and will accordingly generate an internal DMA request. The DMA interface handler 307A will first read out the necessary parameters from the ETD, like MaximumPacketSize, and then propagate the internal DMA request to the external DMA controller 113.

Host Controller 301 keeps an internal data byte counter, and packet counter to indicate the byte count and the packet count that the DMA controller has already written to the local memory 308.

When NP packets have been transferred from the system memory 102 to the local memory 308, the DMA control logic of the Host Controller 301 validates this mega-buffer (X or Y) through a bit in the XbufferFilled or YbufferFilled register 818. At the end of a transfer, system memory 102 may have less than NP packets to write to local memory 308.

When all packets have been written, the DMA control logic will validate the mega-buffer (X or Y) through XbufferFilled or YbufferFilled register 818. The read side of local memory 308 detects this special case with the help of PacketCount and the LastPacketSize. The last packet may be a short packet, as determined by LastPacketSize. For an OUT endpoint, if PacketCount is one and the LastPacketSize is zero, a zero-length packet is sent for this TD. When all packets have been sent out to the device endpoint, the Host Controller 301 will generate a deferred interrupt according to DI (DelayInterrupt).

In the PIO mode, in order to start the data phase, CPU 101 first writes the physical start address of the local data memory into StartAddress register 818. CPU 101 keeps track of data written.

When NP packets of data have been written, the microprocessor validates the mega-buffer (X or Y) through XbufferFilled or YbufferFilled register, for transmission to USB bus 111. Within the same mega-buffer, Host Controller 301 increments its memory pointer. When one mega-buffer (X 601 or Y 602) is full, CPU 101 allows Host Controller to switch to the mega-buffer (Y or X), by first writing the starting address of that mega-buffer to the StartAddress register 818.

At the end of a transfer, CPU 101 may have less than NP packets to write to local memory 308. When all packets have been written, CPU 101 validates the mega-buffer (X or Y) through XbufferFilled or YbufferFilled register. The read side of the local memory 308 detects this special case with the help of PacketCount and the LastPacketSize. If the LastPacketSize is zero, a zero-length packet will be sent.

In another aspect of the present invention the mega-buffers of FIG. 6A are used in a circular fashion. For example, when Y-Buffer 602 is full and less than PacketCount packets have been written from system memory 102, then the next incoming packet is routed into X-Buffer 601. This process continues until all packets have been written.

Host Controller 301 will generate an interrupt when it has read out and successfully sent all the packets in a mega-buffer, and clear the XbufferFilled or YbufferFilled register, and generate appropriate interrupt to microprocessor All other mechanisms are the same as in DMA mode.

Figure 7:
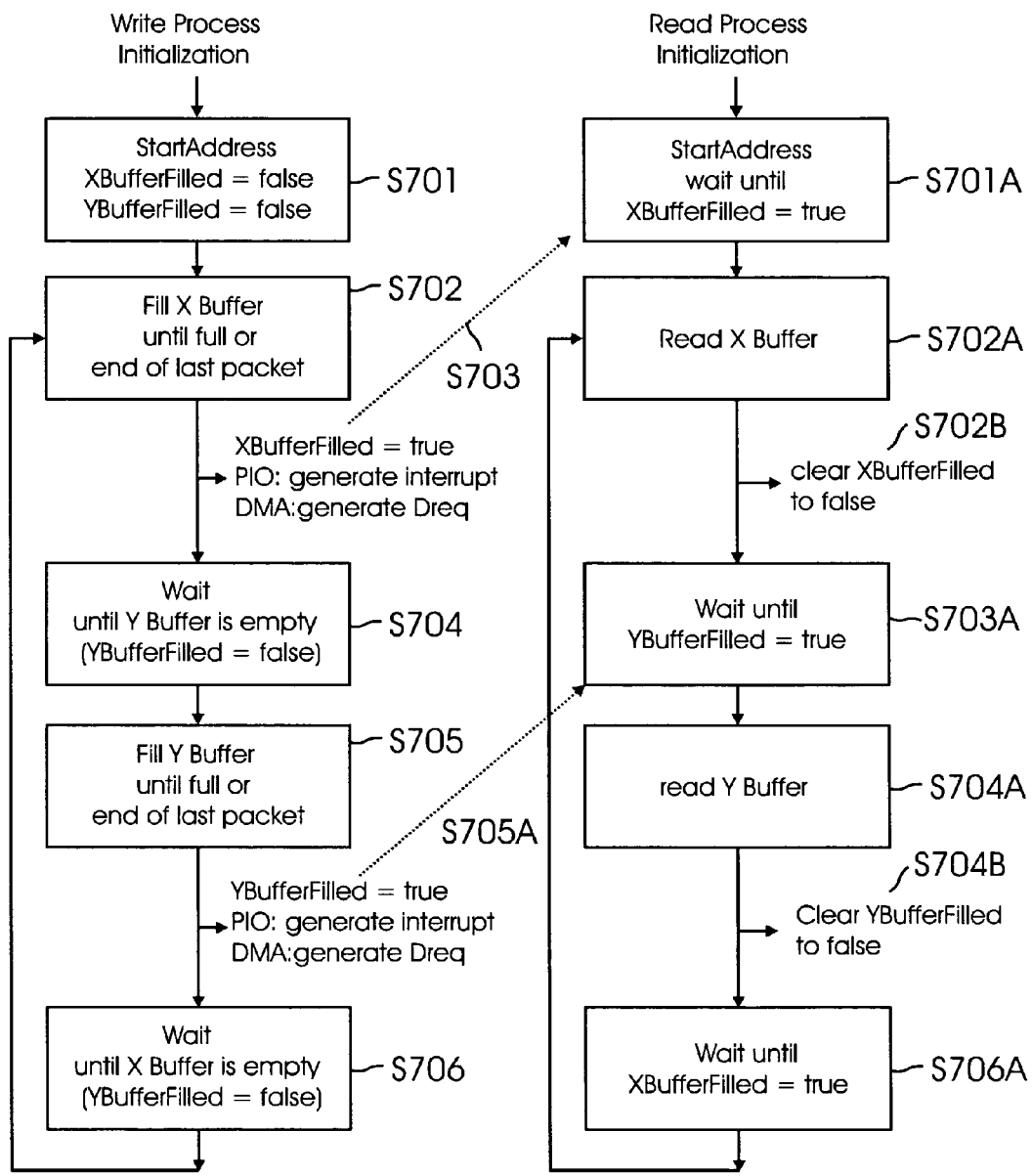
FIG. 7 is a flow diagram of executable steps showing the use of mega-buffers when data is sent from an endpoint, according to one aspect of the present invention.

FIG. 7 shows executable process steps when data is sent IN to host system 100A.

Turning now in detail to FIG. 7, in step S701, CPU 101 writes the starting physical address into the Start Address Register 818 located at 301D.

In step S702, based upon the ETD, data is written to memory 308. Data is first written to X buffer 601. When X-buffer 601 is full in step S702, it is indicated by the Xbuffer Filled register 820 in step S703. Once X-buffer 601 is filled, it may be read in step S702A. While data is read from X-buffer 601 in step S702A, in step S704, data is written to Y-buffer 602. X-buffer 601 and Y-buffer 602 are used in a circular fashion, as discussed above.

In step S705, Y-buffer 602 is filled and then read in step S704A. This process continues, namely, X-Buffer 601 is filled in step S706 and the process waits until X-buffer is read in step S706A.

Interrupts are generated in steps S703 and 705A and are described above with respect to FIG. 6B.

The foregoing buffering techniques has advantages because it allows Host Controller 301 to transfer data efficiently. For an endpoint working in the PIO mode, very few interrupts are required. For example, if a bulk/control/interrupt endpoint is 64 bytes and NP is chosen as 1023 910 bits) 10 bits, then only one interrupt is retired because 1024*64=64K bytes of data. CPU 101 may scale the interrupt frequency based on the value of NP, and actual size of memory 308.

For isochronous endpoint, packet size varies, and the adaptive nature of the present invention allows varying the size of NP and the size of the foregoing mega-buffers.

Operational Registers

FIG. 8A provides a list of plural operational registers that are used by Host Controller 301, in one aspect of the present invention. Among other functions, the registers are used for Control and Status, Memory Pointers, Frame Counters and Root Hub. Dwords are used to write and read the registers. To ensure interoperability, Host Controller Driver 202 does not use a reserved field and should not assume that the reserved field contains 0. Furthermore, Host Controller Driver 202 preserves the value(s) of the reserved field.

When a read/write register is modified, Host Controller Driver 202 first reads the register, modifies the bits desired, then writes the register with the reserved bits still containing the read value. Alternatively, Host Controller Driver 202 may maintain an in-memory copy of previously written values that can be modified and then written to Host Controller 301 registers.

Figure 8B:
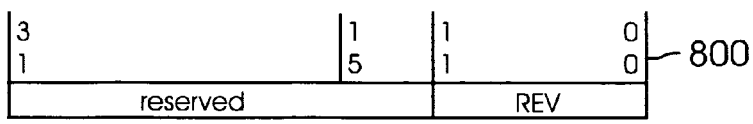

FIG. 8B shows register 800 that controls revision level of the systems according to one aspect of the invention. Table 801, provides a description of the field "REV".

FIG. 8C shows the HcControl register 802 that defines the operating modes for Host Controller 301. Host Controller Driver 202 can modify most of the fields, except, Host ControllerFunctionalState field, which is modified by Host Controller 301. The various fields in register 802 are described in Table 803.

FIG. 8D shows HcCommandStatus register 804 that is used by Host Controller 301 to receive commands issued by Host Controller Driver 202, as well as reflecting the current status of Host Controller 301. To Host Controller Driver 202, HcCommandStatus register 804 appears to be a "write to set" register. Host Controller 301 ensures that bits written, e.g., as '1' become set in the register while bits written as others, e.g., '0' remain unchanged in the register. Host Controller Driver 202 may issue multiple distinct commands to Host Controller 301 without concern for corrupting previously issued commands. Host Controller Driver 202 has normal read access to all bits.

The plural fields in register 804 are explained in table 805. For example, the SchedulingOverrunCount field indicates the number of overrun frames detected by Host Controller 301. This occurs when either isochronous or interrupt list do not complete before end of frame (EOF). When a scheduling overrun error is detected, Host Controller 301 increments the counter and sets the SchedulingOverrun field in the HcInterruptStatus register 804.

HcSystemInterruptStatus Register

FIG. 8E shows the HcSystemInterruptStatus register 806 fields that are described in table 807. This register provides the status on various system level events that cause hardware interrupts. When a system level event occurs, Host Controller 301 sets the corresponding bit in this register. When a bit becomes set, a hardware interrupt is generated if the interrupt is enabled in the HcSystemInterruptEnable register 808 and the MasterSystemInterruptEnable bit is set. Host Controller Driver 202 may clear specific bits in this register by writing, e.g., '1' to bit positions.

HcSystemInterruptEnable Register

FIG. 8F shows a HcSystemInterruptEnable register 808 field that are described in Table 809, according to one aspect of the present invention. Each enable bit in the HcSystemInterruptEnable register 808 corresponds to an associated interrupt bit in the HcSystemInterruptStatus register 806. The HcSystemInterruptEnable register 808 is used to control which system level events generate a hardware interrupt. When a bit is set in the HcSystemInterruptStatus register 808 and the corresponding bit in the HcSystemInterruptEnable register 808 is set and the MasterSystemInterruptEnable bit is set, then a hardware interrupt is generated on the host bus 101A.

Writing a '1' to a bit in this register sets the corresponding bit, whereas writing a '0' to a bit in this register leaves the corresponding bit unchanged. On read, the current value of this register is returned.

HcSystemInterruptDisable Register"

FIG. 8G shows HcSystemInterruptDisable Register 810, according to one aspect of the present invention. Each disable bit in the HcSystemInterruptDisable register 810 corresponds to an associated interrupt bit in the HcSystemInterruptStatus register 806. HcSystemInterruptDisable register 810 is coupled with the HcSystemInterruptEnable register 808. Thus, writing, e.g., a '1' to a bit in this register clears the corresponding bit in the HcSystemInterruptEnable register 808, whereas writing a '0' to a bit in this register leaves the corresponding bit in the HcSystemInterruptEnable register 808 unchanged. On read, the current value of the HcSystemInterruptEnable register 808 is returned. Table 811 describes the various fields of register 810.

HcETDInterruptStatus Register:

FIG. 8H shows the HcETDInterruptStatus register 812 fields that are described in table 813, according to one aspect of the present invention. This register provides status on various ETD level events that cause hardware interrupts. When an ETD level event occurs, Host Controller 301 sets the corresponding bit in this register 812. When a bit becomes set, a hardware interrupt is generated if the interrupt is enabled in the HcETDInterruptEnable register 814 and the INTH bit of ChipInterruptEnable is set. Host Controller Driver 201 may clear specific bits in this register by writing, e.g., '1' to bit positions to be cleared. Host Controller Driver 201 may not set any of these bits.

HcETDInterruptEnable Register:

FIG. 8I shows HcETDInterruptEnable Register 814 and the various fields of HcETDInterruptEnable Register 814 are described in table 815. Each enable bit in the HcETDInterruptEnable register 814 corresponds to an associated interrupt bit in the HcETDInterruptStatus register 814. HcETDInterruptEnable register 814 is used to control ETD events and generate hardware interrupts. When a bit is set in HcETDInterruptStatus register 812 and HcETDInterruptEnable register 814, a hardware interrupt is generated on the host bus.

Writing e.g., a '1' to a bit in register 814 sets the corresponding bit, whereas writing a '0' to a bit in this register leaves the corresponding bit unchanged. On read, the current value of this register is returned.

HcETDInterruptDisable Register:

FIG. 8K shows HcETDInterruptDisable register 816 with a description of various field in table 817. Each disable bit in HcETDInterruptDisable register 816 corresponds to an associated interrupt bit in the HcETDInterruptStatus register 814. HcETDInterruptDisable register 816 is coupled to HcETDInterruptEnable register 814. Thus, writing e.g., a '1' to a bit in this register 816 clears the corresponding bit in the HcETDInterruptEnable register 814, whereas writing a '0' to a bit leaves the corresponding bit in the HcETDInterruptEnable register 814 unchanged. On read, the current value of the HcETDInterruptEnable register 816 is returned.

HcAccessStartAddress Register:

HcAccessStartAddress register 818 as shown in FIG. 8L specifies the physical start address of local memory 308 (ETD memory 308A or Data 308A) that processor 101 accesses. Table 819 describes the plural fields shown for register 818.

HcXYBufferFilledStatus Register:

FIG. 8M shows HcXYBufferFilledSet register 820 and table 821 describes the various fields. HcXYBufferFilledSet register 820 value indicates the current status (filled or not) of X/Y buffer (FIG. 6A) of an endpoint. When data is transferred from system memory 102, in the PIO mode, microprocessor 101 sets FnX (FnY) by writing e.g., a '1' into the FSnX (FSnY) bit of the HcXYBufferFilledSet register 820, when the X (Y) mega-buffer is full. In the DMA mode, Host Controller 301 sets FnX (FnY) when the X (Y) buffer is full. Host Controller 301 clears FnX (FnY) when all the packets in the buffer have been sent on the USB bus.

For incoming data from a USB device, Host Controller 301 sets FnX (FnY) when it has received NP packets from the USB bus and saved them into the X (Y) buffer. FnX (FnY) is cleared by microprocessor (PIO mode) 101 by writing a '1' into the FCnX (FCnY) bit of the HcXYBufferFilledClear register 824, or Host Controller 301 clears the register when all the packets inside the buffer have been transferred to the system memory.

HcXYBufferFilledSet Register:

FIG. 8N shows HcXYBufferFilledSet register 822 and table 823 describes the various fields associated therewith. Host Controller Driver 202 uses this register to set the FnX (FnY) bit of an OUT endpoint when the X (Y) buffer is full. In DMA mode, Host Controller 301 sets FnX (FnY) when the X (Y) buffer is full. For an OUT endpoint, writing e.g., a '1' to FSnX (or FSnY) sets the corresponding bit in HcXYBufferFilled register 822. Writing a '0' has no effect.

HcXYBufferFilledClear Register:

FIG. 8O shows HcXYBufferFilledClear register 824, while table 824A describes the various associated fields. Host Controller Driver 202 uses this register to clear the FnX (FnY)

bit of an IN endpoint when the X (Y) buffer has been read. In DMA mode, the Host Controller 301 clears the FnX (FnY) value when the X (Y) buffer has been read. Writing a '1' to FCnX (or FCnY) clears the corresponding bit in HcXY-BufferFilled register 820, for an IN endpoint. Writing a '0' has no effect. For an OUT endpoint, this register has no influence on the HcXYBufferFilled register 820.

HcETDEnableSet Register:

FIG. 8P shows HcETDEnableSet register 825 and table 826 describes the various associated fields. HcETDEnableSet register 825 individually enables one or several ETDs, by writing a '1' into the corresponding bit of the ETDs to be enabled.

HcETDEnableClear Register:

FIG. 8Q shows the various fields in HcETDEnableClear register 827 and table 828 describes those fields. HcETDEnableClear register 827 individually disables one or several ETDs, by writing e.g., a '1' into the corresponding bit of these ETDs to be disabled. Host Controller Driver 202 can use this register to stop the execution of an ETD before the ETD is retired. However, if a transaction is in process it will be finished. The clearing of this bit takes effect at the latest at the next SOF.

HcETDEnableStatus Register:

FIG. 8R shows the various fields of HcETDEnableStatus register 829 that are described in table 830. HcETDEnableStatus register 829 is a read-only register and indicates the enabled ETDs. An ETD is enabled when its corresponding bit in HcSetEnableETD register is e.g., '1'. An ETD is disabled when its corresponding bit in HcSetEnableETD register 825 is '0'.

HcDirectRouting Register:

FIG. 8S shows the various fields of HcDirectRouting Register 831 which are described in table 832. If two devices are connected to host 100A, and one has an IN endpoint and the other has an OUT endpoint of same size, then the data from the IN endpoint can be directly routed to the OUT endpoint, through local memory 308. Data does not need to go to the system memory 102. The direct-routing is done by programming two TDs with the same location, and linking the HcXYFilled registers 822.

HcXY Filled Register:

Source: X|Yfilled is set by Host Controller 301 when full. It is cleared on the falling edge of the X|Yfilled of the sink.

Sink: X|Yfilled is set by Host Controller 301 on the rising edge of X|Yfilled of the source. When the X|Y buffer is consumed, X|Yfilled is cleared by Host Controller 301.

HcImmediateInterruptETDs Register:

FIG. 8T shows the various fields of HcImmediateInterruptETD register 833, and the fields are described in table 834. HcImmediateInterruptETD register 833 contains identification of ETDs. The retirement of ETDs triggers an interrupt to the CPU 101, regardless its original DelayInterrupt setting, and the interrupt counter.

One example is to set the control endpoint Setup ETD as the ImmediateInterruptEnabler. When it is retired, an immediate interrupt is generated, so that the system processor 101 can enable the Data phase or the Status phase of the control endpoint immediately, instead of having to wait until next frame.

HcDoneQueue Register:

FIG. 8U shows the various fields of HcDoneQueue register 835 and table 836 describes those fields. HcDoneQueue register 835 contains identification of all TDs completed since the last DI induced interrupt.

HcFmInterval Register:

FIG. 8V shows the various fields of HcFmInterval register 837 and table 838 describes those fields. HcFmInterval register 837 contains a certain value, e.g., a 14-bit value which indicates the bit time interval in a Frame, (i.e., between two consecutive SOFs), and a 15-bit value indicating the Full Speed maximum packet size that Host Controller 301 may transmit or receive without causing scheduling overrun. Host Controller Driver 202 may carry out minor adjustment on the FrameInterval by writing a new value over the present one at each SOF. This allows Host Controller 301 to synchronize with an external clocking resource and to adjust any unknown local clock offset.

HcFmRemaining Register:

FIG. 8W shows the various fields of HcFmRemaining register 839 and table 840 describes those fields. HcFmRemaining register 839 is a 14-bit down counter showing the bit time remaining in a current Frame.

HcFmNumber Register:

FIG. 8X shows the various fields of HcFmNumber register 841 and table 842 describes those fields. HcFmNumber register 841 includes a counter, e.g., a 16-bit counter. It provides a timing reference among events happening in Host Controller 301 and Host Controller Driver 202. Host Controller Driver 202 may use the 16-bit value specified in this register and generate, e.g., a 32-bit frame number without requiring frequent access to the register.

HcLSThreshold Register:

FIG. 8Y HcLSThreshold register 843 contains e.g., a 11-bit value used by the Host Controller to determine whether to commit to the transfer of a maximum LS packet before EOF (FIG. 2).

Root Hub Partition:

All the foregoing are dedicated to USB Root Hub 309 (or 104) which is an integral part of the Host Controller though still a functionally separate entity. Host Controller Driver 202 emulates USB device accesses to the Root Hub via a register interface. Host Controller Driver 202 maintains many USB-defined hub features which are not required to be supported in hardware. For example, the Hub's Device, Configuration, Interface, and Endpoint Descriptors are maintained only in the Host Controller Driver 202 as well as some static fields of the Class Descriptor. Host Controller Driver 202 also maintains and decodes the Root Hub's device address as well as other trivial operations which are better suited to software than hardware.

Root Hub register interface is developed to maintain similarity of bit organization and operation to typical hubs that are found in the system. Below are four register definitions: HcRhDescriptorA, HcRhDescriptorB, HcRhStatus, and HcRhPortStatus[1:NDP]. Each register is read and written as a Dword. These registers are only written during initialization to correspond with the system implementation. The HcRhDescriptorA and HcRhDescriptorB registers are implemented such that they are writeable regardless of the HC USB state. HcRhStatus and HcRhPortStatus must be writeable during the USB OPERATIONAL state.

HcRhDescriptorA Register:

FIG. 8Z describes the various fields of HcRhDescriptorA register 845 and table 846 describes those fields. HcRhDescriptorA register 845 is the first register of describing the characteristics of Root Hub 309A or 104. Reset values are implementation-specific. The descriptor length (11), descriptor type, and hub controller current (0) fields of the hub Class Descriptor are emulated by host driver 202. All other fields are located in the HcRhDescriptorA 845 and HcRhDescriptorB 847 registers.

HcRhDescriptorB Register:

FIG. 9A describes the various fields of HcRhDescriptorB register 847 and table 848 describes those fields. HcRhDescriptorB register 847 is the second register describing the characteristics of the Root Hub. These fields are written during initialization to correspond with the system implementation. Reset values are implementation-specific.

HcRhStatus Register:

FIG. 9B describes the various fields of HcRhStatus register 849 and table 850 describes those fields. HcRhStatus register 849 is divided into two parts. The lower word of a Dword represents the Hub Status field and the upper word represents the Hub Status Change field. Reserved bits should always be written '0'.

HcRhPortStatus[0:NDP] Register

Figure 9C:

FIG. 9C describes the various fields of HcRhPortStatus[1: NDP] register 851 and table 852 describes those fields. HcRhPortStatus[1:NDP] register 851 is used to control and report port events on a per-port basis. NumberDownstreamPorts represents the number of HcRhPortStatus registers 851 that are implemented. The lower word is used to reflect the port status, whereas the upper word reflects the status change bits. Some status bits are implemented with special write behavior. If a transaction (token through handshake) is in progress when a write to change port status occurs, the resulting port status change must be postponed until the transaction completes. Reserved bits should always be written '0'.

In yet another aspect, the present invention provides a method for transferring data between a host system and a USB Host Controller, comprising of setting up an ETD table, wherein the ETD table is set up by the host system and then loaded into a memory storage device at the USB Host Controller; scanning all ETDs at a start of frame of the ETD to determine isochronous endpoints; and executing the ETDs for isochronous endpoints.

In yet another aspect of the present invention, each ETD may be individually programmed for DMA or PIO mode. When an ETD is removed, the associated DMA channel is also dissolved. When the ETD is put on a DoneQueue, the corresponding working mode bit is also cleared. This means that the DMA channel association exists at the ETD (transfer) level. The freed DMA channel can be used for the next ETD of the same endpoint, or for another ETD. Hence, DMA channels are efficiently used to transfer data.

In yet another aspect of the present invention, the foregoing buffering techniques has advantages because it allows Host Controller to transfer data efficiently. For an endpoint working in the PIO mode, very few interrupts are required. For isochronous endpoint, packet size varies, and the adaptive nature of the present invention allows varying the size of number of packet per buffer and the size of the foregoing mega-buffers.

In yet another aspect of the present invention, local memory buffers may be programmed based on packet size and hence overrun and underrun situation can be handled efficiently.

In yet another aspect of the present invention, The ED format is the same for all endpoints, while the TDs may be different and packets are programmed accordingly. This reduces overhead between the host and Host Controller.

In yet another aspect of the present invention, since ETDs are written into local memory at the Host controller level, no special bus mastering is required. Also, only active ETDs are placed in local memory and hence they can be executed efficiently.

In yet another aspect of the present invention, since ETDs are transferred from local memory, system bus resources are used for other functions.

In yet another aspect of the present invention, the system is scalable based on local memory size and hence less taxing on address buses.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A system, comprising:
   an interface to a host system with control logic used for transferring data between the host system and a Universal Bus System (USB) Host Controller;
   a memory storage space for storing a plurality of endpoint and transfer descriptors (ETDs) in an ETD table, where each ETD includes an endpoint descriptor with a field for identifying a type of transfer, and a transfer descriptor for an endpoint linked to the endpoint descriptor for each endpoint, the transfer descriptor identifying data that is moved to and from the endpoint, wherein a processing mode for processing each ETD either in a programmable input and output ("PIO") mode or a direct memory access (DMA) mode is programmed when the ETD table is setup; and if an ETD is processed in the DMA mode, a DMA channel used for processing the ETD is released after the ETD is processed;
   a memory buffer for storing at least one USB data packet associated with a USB transfer;
   a link for determining a location in the memory buffer associated with the USB transfer specified by an ETD; and
   logic that executes the USB transfer using a USB protocol in a priority order, wherein order specifies an order in which the plurality of ETDs are processed.

2. The system of claim 1, wherein an ETD from amongst the plurality of ETDs is for an isochronous transfer and the ETD for the isochronous transfer is processed before any other ETD for any other endpoint.

3. The system of claim 1, wherein an ETD from amongst the plurality of ETDs is for an interrupt transfer and the ETD for the interrupt transfer is processed after a pending ETD for an isochronous transfer has been processed.

4. The system of claim 1, wherein ETDs for a Control transfer and for a Bulk transfer are given the same priority and are processed after pending ETDs for an isochronous transfer and an interrupt transfer has been processed.

5. The system of claim 1, wherein the interface includes a DMA channel for enabling the DMA mode to process an ETD, if the DMA mode was specified in the ETD table.

6. A Universal Serial Bus ("USB") Host Controller for transferring information between a host system and a USB device, comprising:
   an Endpoint Transfer Descriptor (ETD) table that is setup by the host system at a memory storage space in the USB Host Controller, wherein the ETD table stores a plurality of ETDs, each ETD including an endpoint descriptor with a field for identifying a type of transfer, and a transfer descriptor for an endpoint linked to the endpoint descriptor for each endpoint, the transfer descriptor identifying data that is moved to and from the endpoint and each ETD is enabled using at least one operational register; and when the plurality of ETDs are setup in the ETD table, a processing mode for each ETD is programmed to process the ETD either in a programmable input and output ("PIO") mode or a direct memory access (DMA) mode, and if an ETD is processed in the DMA mode, a DMA channel used for processing the ETD is released, after the ETD is processed.

7. The USB Host Controller of claim 6, wherein the USB Host Controller includes a scheduler that scans the ETD table for executing the plurality of ETDs for an isochronous endpoint, an interrupt endpoint, a control endpoint and a bulk endpoint.

8. The USB Host Controller of claim 6, wherein an ETD from amongst the plurality of ETDs is for an isochronous transfer and the ETD for the isochronous transfer is processed before any other ETD for any other endpoint.

9. The USB Host Controller of claim 6, wherein an ETD from amongst the plurality of ETDs is for an interrupt transfer and the ETD for the interrupt transfer is processed after a pending ETD for an isochronous transfer has been processed.

10. The USB Host Controller of claim 6, wherein ETDs for a Control transfer and for a Bulk transfer are given the same priority and are processed after pending ETDs for an isochronous transfer and an interrupt transfer has been processed.

11. The USB Host Contoller of claim 6, wherein the interface includes a DMA channel for enabling the DMA mode to process an ETD, if the DMA mode was specified in the ETD table.

12. A method for transferring information between a host system and a Universal Serial Bus ("USB") device via a USB Host Controller, comprising:

setting up an endpoint and transfer descriptor (ETD) table, wherein the ETD table is set up and loaded into a memory storage space in the USB Host Controller by the host system, and the ETD table stores a plurality of ETDs, which are enabled using at least one operational register; each ETD includes an Endpoint Descriptor with at least a field for identifying a type of transfer, and a Transfer Descriptor for an endpoint linked to the Endpoint Descriptor, the Transfer Descriptor identifying data that is moved to and from the endpoint; and when the plurality of ETDs are setup in the ETD table, a processing mode for processing each of the plurality of ETDs either in a programmable input and output ("PIO") mode or a direct memory access (DMA) mode is programmed;

scanning the plurality of ETDs at a start of frame, wherein the Host Controller scans the plurality of ETDs; and executing the plurality of ETDs based on a priority order; wherein the priority order specifies an order in which the ETDs are processed and if an ETD is processed in the DMA mode, a DMA channel used for processing the ETD is released after the ETD is processed.

13. The method of claim 12, further comprising:

reserving a percentage of time in a frame for executing control transfers and bulk transfers as specified by ETDs associated with control transfers and bulk transfers.

14. The method of claim 12, wherein an ETD from amongst the plurality of ETDs is for an isochronous transfer and the ETD for the isochronous transfer is processed before any other ETD for any other endpoint.

15. The method of claim 12, wherein an ETD from amongst the plurality of ETDs is for an interrupt transfer and the ETD for the interrupt transfer is processed after a pending ETD for an isochronous transfer has been processed.

16. The method of claim 12, wherein ETDs for a Control transfer and for a Bulk transfer are given the same priority and are processed after pending ETDs for an isochronous transfer and an interrupt transfer has been processed.

* * * * *